US012731748B2

(12) United States Patent
Wei

(10) Patent No.: US 12,731,748 B2
(45) Date of Patent: Sep. 8, 2026

(54) ELECTROMAGNETIC RELAY

(71) Applicant: Xiamen Hongfa Automotive Electronics Co., Ltd., Xiamen (CN)

(72) Inventor: Liangui Wei, Xiamen (CN)

(73) Assignee: Xiamen Hongfa Automotive Electronics Co., Ltd., Xiamen (CN)

( * ) Notice: Subject to any disclaimer, the term of this patent is extended or adjusted under 35 U.S.C. 154(b) by 0 days.

(21) Appl. No.: 18/666,124

(22) Filed: May 16, 2024

(65) Prior Publication Data

US 2024/0304404 A1 Sep. 12, 2024

Related U.S. Application Data

(63) Continuation of application No. 17/770,023, filed as application No. PCT/CN2020/125283 on Oct. 30, 2020, now Pat. No. 12,020,879.

(51) Int. Cl.
*H01H 50/54* (2006.01)
*H01H 50/02* (2006.01)
(Continued)

(52) U.S. Cl.
CPC .......... *H01H 50/54* (2013.01); *H01H 50/023* (2013.01); *H01H 50/047* (2013.01);
(Continued)

(58) Field of Classification Search
CPC .... H01H 50/54; H01H 50/023; H01H 50/047; H01H 50/12; H01H 50/14; H01H 50/443; H01H 50/28; H01H 50/305
(Continued)

(56) References Cited

U.S. PATENT DOCUMENTS

| | | | |
|---|---|---|---|
| 1,928,846 | A | 10/1933 | Allen |
| 3,784,941 | A | 1/1974 | Du Rocher |

(Continued)

FOREIGN PATENT DOCUMENTS

| | | | |
|---|---|---|---|
| CN | 203536302 | U | 4/2014 |
| CN | 205406324 | U | 7/2016 |

(Continued)

OTHER PUBLICATIONS

International Search Report mailed Feb. 10, 2021, in connection with International Application No. PCT/CN2020/125283.

(Continued)

*Primary Examiner* — Shawki S Ismail
*Assistant Examiner* — Lisa N Homza
(74) *Attorney, Agent, or Firm* — Wolf, Greenfield & Sacks, P.C.

(57) ABSTRACT

An electromagnetic relay includes a base, a casing, a coil, a movable contact piece and two fixed contact pieces. Each of the fixed contact pieces includes a plate-shaped base. A portion of one side of the plate-shaped base extends outward and is bent to form a fixed contact fixing part. The fixed contacts are arranged on the fixed contact fixing part, and an abdicating through hole is defined in the base. The plate-shaped bases of the fixed contact pieces are respectively connected to an outer side surface of the base and spaced from each other. Each of the fixed contact fixing parts protrudes through the abdicating through hole and located between the base and the casing. Each of the fixed contacts faces to the movable contact on the movable contact piece, and a portion of the plate-shaped base on the fixed contact piece protrudes out of the casing to form a connecting part.

12 Claims, 27 Drawing Sheets

(51) Int. Cl.
*H01H 50/04* (2006.01)
*H01H 50/12* (2006.01)
*H01H 50/14* (2006.01)
*H01H 50/44* (2006.01)

(52) U.S. Cl.
CPC ............ *H01H 50/12* (2013.01); *H01H 50/14* (2013.01); *H01H 50/443* (2013.01)

(58) Field of Classification Search
USPC .......................................................... 335/156
See application file for complete search history.

(56) References Cited

U.S. PATENT DOCUMENTS

| | | | |
|---|---|---|---|
| 4,383,232 | A | 5/1983 | Richert |
| 4,532,487 | A | 7/1985 | Nagamoto et al. |
| 4,616,201 | A | 10/1986 | Nagamoto |
| 4,638,274 | A | 1/1987 | Archer et al. |
| 4,638,275 | A | 1/1987 | Belbel et al. |
| 4,910,484 | A | 3/1990 | Shikano et al. |
| 5,389,905 | A | 2/1995 | Shibata et al. |
| 6,075,429 | A | 6/2000 | Uotome et al. |
| 6,246,306 | B1 | 6/2001 | Gruner |
| 12,020,879 | B2 | 6/2024 | Wei |
| 2002/0036557 | A1 | 3/2002 | Nakamura et al. |
| 2005/0057332 | A1 | 3/2005 | Nakamura et al. |
| 2007/0154012 | A1 | 7/2007 | Giacometto et al. |
| 2007/0241847 | A1 | 10/2007 | Yamamoto et al. |
| 2008/0174391 | A1 | 7/2008 | Bolz et al. |
| 2010/0237968 | A1 | 9/2010 | Kurasawa |
| 2011/0121926 | A1 | 5/2011 | Kojima et al. |
| 2011/0140813 | A1 | 6/2011 | Suzuki et al. |
| 2011/0181382 | A1 | 7/2011 | Eum |
| 2013/0057369 | A1 | 3/2013 | Yano et al. |
| 2013/0293324 | A1 | 11/2013 | Fujimoto et al. |
| 2014/0062626 | A1 | 3/2014 | Saito et al. |
| 2016/0148739 | A1 | 5/2016 | Suzuki |
| 2016/0233039 | A1 | 8/2016 | Kanematsu et al. |
| 2016/0372286 | A1 | 12/2016 | Kubono et al. |
| 2017/0148596 | A1 | 5/2017 | Ozaki et al. |
| 2018/0053614 | A1 | 2/2018 | Nakahara |
| 2018/0061600 | A1 | 3/2018 | Ito |
| 2018/0166240 | A1 | 6/2018 | Daikoku et al. |
| 2018/0261414 | A1 | 9/2018 | Fujimura et al. |
| 2019/0157030 | A1 | 5/2019 | Sunohara et al. |
| 2019/0180964 | A1 | 6/2019 | Lin et al. |
| 2019/0304723 | A1 | 10/2019 | Lim et al. |
| 2020/0161067 | A1 | 5/2020 | Harano et al. |
| 2020/0176207 | A1 | 6/2020 | Kubono |
| 2020/0176209 | A1 | 6/2020 | Kubono |
| 2020/0234093 | A1 | 7/2020 | Okamura |
| 2020/0234903 | A1 | 7/2020 | Lin et al. |
| 2020/0243291 | A1 | 7/2020 | Ito |
| 2021/0098214 | A1 | 4/2021 | Carlson et al. |
| 2021/0098217 | A1 | 4/2021 | Omari et al. |
| 2021/0098218 | A1 | 4/2021 | Elmiger et al. |
| 2022/0392725 | A1 | 12/2022 | Wei |
| 2023/0019139 | A1 | 1/2023 | Murakoshi |
| 2023/0197367 | A1 | 6/2023 | Johansson |
| 2023/0420206 | A1 | 12/2023 | Chen et al. |

FOREIGN PATENT DOCUMENTS

| | | | | | |
|---|---|---|---|---|---|
| CN | 206546890 | U | | 10/2017 | |
| CN | 108305818 | A | | 7/2018 | |
| CN | 108666176 | A | | 10/2018 | |
| CN | 208028000 | U | | 10/2018 | |
| CN | 110164731 | A | * | 8/2019 | ............. H01H 35/26 |
| CN | 110797233 | A | | 2/2020 | |
| CN | 110828238 | A | | 2/2020 | |
| CN | 210743878 | U | | 6/2020 | |
| CN | 211294973 | U | | 8/2020 | |
| CN | 211294986 | U | | 8/2020 | |
| JP | 2019-106294 | A | | 6/2019 | |
| KR | 100749784 | B1 | | 8/2007 | |

OTHER PUBLICATIONS

Chinese Office Action dated May 16, 2024, in connection with Chinese Application No. 201911061336.8, with English translation thereof.

Chinese Office Action dated Nov. 21, 2024, in connection with Chinese Application No. 201911061973.5, with English translation thereof.

* cited by examiner

ELECTROMAGNETIC RELAY

CROSS REFERENCE

The present disclosure is a continuation application of U.S. patent application Ser. No. 17/770,023 filed Apr. 18, 2022, which is a national stage filing under 35 U.S.C. § 371 of International PCT Application No. PCT/CN2020/125283, filed Oct. 30, 2020, which claims priority to the Chinese Patent Applications No. 201911061973.5, 201911061336.8 and 201921874833.5 all of three Chinese patent applications filed on Nov. 1, 2019, the disclosures of which are hereby incorporated by reference in their entirety.

TECHNICAL FIELD

The present disclosure relates to the manufacturing technical field of a relay, in particular an electromagnetic relay.

BACKGROUND

An electromagnetic relay is an electronic control device. It has a control system (also referred to as an input loop) and a controlled system (also referred to as an output loop). It is usually used in an automatic control circuit. The electromagnetic relay actually is an “automatic switch” that controls a larger current and a higher voltage by using a smaller current and a lower voltage, so that it plays a role of automatic adjustment, safety protection, and conversion circuit in the circuit.

The electromagnetic relay, especially a hinge type relay, usually includes a base, a casing, a coil, a movable contact piece and two fixed contact pieces. The casing is connected to the base. The coil is wound on the bobbin. The bobbin and the base form a fixed connection. A core is provided within a center hole of the bobbin. A yoke is connected (i.e., fixedly connected) with the bobbin. The movable contact piece is bent in the middle thereof, and has one end connected with the yoke and the other end connected with an armature which faces to the yoke. The two fixed contact pieces are connected with the base, and two fixed contacts on the two fixed contact pieces correspond to the two movable contacts on the movable contact piece. As for some electromagnetic relays with high power, a large space is occupied due to a large volume of the fixed contact pieces. A main body of the fixed contact piece and the base are usually injection-molded as one piece to facilitate the arrangement and fixation of a lead-out end of the fixed contact piece in order to reduce the occupation of the space. However, the main body of the fixed contact piece and the base are injection-molded as one piece, which presents problems: 1. The fixed contact piece has poor heat dissipation, and thus affects the performance of the relay; especially as for a high-current electromagnetic relay (such as relay with a contact current reaching over 200 A), a heating value $Q=I^2*R*t$, that is, the heating value is proportional to a square value of the current, the heating value of the high-current relay is very high, if the heat cannot be effectively and quickly dissipated, the relay is very easy to fail due to the high temperature; 2. The injection-molded process is complex, has a defect rate, and a high manufacture cost; 3. The contacts of the fixed contact piece are transferred to a supplier for being inserted and injection-molded and then returned to a factory, the transferring time is long, and the contacts of the fixed contact piece are exposed in an unclean space for a long time and extremely easy to be contaminated, and thus can affect quality and service life of the relay.

In order to facilitate the introduction of a control power supply and output signals, another relay may employ a plug-in piece for connection, for example, a CN invention patent No. ZL201220694968.5 published on Jul. 3, 2013 and titled as “Coil-Voltage Input Connection Structure for Magnetic Latching Relay”, which structure includes a connector assembly, a relay-coil metal pin and a first buckle of a relay-peripheral plastic body arranged around the pin. The connector assembly includes a voltage input signal wire, a metal plug-in terminal and a plastic connector. The plastic connector is provided with a second buckle. The metal plug-in terminal is fixed in the plastic connector, and one end of the metal plug-in terminal is fixed with one end of the voltage input signal wire. The connector assembly is fixed on the relay-periphery plastic body by mutual buckling cooperation of the second buckle of the plastic connector and the first buckle of the relay-periphery plastic body; and the other end of the metal plug-in terminal of the connector assembly is in plug-in matched with the relay-coil metal pin. With employment of this structure, it is convenient to introduce the control power supply; however, with this structure, the metal pin is mounted on the bobbin, and then a gap is provided in the base on which the bobbin is mounted to allow protruding the plug-in end of the metal pin. This structure has a main problem that the coil is more troublesome to manufacture, and the fixing strength of the metal pin is weak, and an external plug housing cannot be positioned reliably when being plugged in, the metal pin is subjected to large force only depending on the mutual cooperation and positioning of the metal pin and the connection end of the external plug, it is easy to skew and fall off after multiple insertions and extractions, which can affect reliability of plug-in and electrical connection. In addition, it is not convenient to arrange other conductive pins around the metal pins, and the functions are relatively simple.

The coil control power supply pin or other pins of another relay can only be plugged into a circuit board and then fixed by welding for use. Usually, this circuit board needs to use a PCB circuit board, and it is difficult to use an FPC circuit board. Moreover, it is difficult to realize automatic assembling operation by using a method of inserting and then welding.

SUMMARY

An electromagnetic relay includes a base, a casing, a coil, a movable contact piece and two fixed contact pieces. The casing is connected with the base. The coil is wound on a bobbin. The bobbin is connected with the base, and the coil is between the base and the casing. The bobbin has a center hole in which a core is installed. The bobbin is connected with a yoke. The movable contact piece has a first end connected to the yoke and a second end connected with an armature and a plurality of movable contacts. The armature faces to one end of the core, and the other end of the core is connected to the yoke directly or connected to the yoke through a magnetic steel. Wherein each of the fixed contact pieces includes a plate-shaped base. A portion of one side of the plate-shaped base extends outward and is bent to form a fixed contact fixing part. The fixed contacts are arranged on the fixed contact fixing part, and an abdicating through hole is defined in the base. The plate-shaped bases of the fixed contact pieces are respectively connected to an outer side surface of the base and spaced from each other. Each of the fixed contact fixing parts protrudes through the abdicating through hole and located between the base and the casing. Each of the fixed contacts faces to the movable contact on the movable contact piece, and a portion of the plate-shaped base on the fixed contact piece protrudes out of the casing to form a connecting part.

In an embodiment, portions of three sides of the plate-shaped base of each of the fixed contact piece extends outward and are bent to form riveting fixing parts. a plurality of riveting holes are provided in the base, and the riveting fixing parts are respectively fitted to the riveting holes so that the plate-shaped base is connected to the outer side surface of the base. The fixed contact fixing part of the fixed contact piece is perpendicular to the plate-shaped base. In this way, it is possible to facilitate the assembly and connection of the fixed contact piece and the base, and improve the preparation efficiency.

In an embodiment, an assembly area is provided on one side of the base close to the second end of the movable contact piece, and the assembly area is connected with a rubber block which restricts a moving distance of rebounding and resetting the second end of the movable contact piece and provides a buffering effect. This can greatly reduce noise generated by the rebound of the movable contact piece.

In an embodiment, the movable contact piece is bent at a middle portion of the movable contact piece. The rubber block comprises a block-shaped main body, and rear portions of left and right sides of the block-shaped main body respectively extend outward to form a positioning protruding part. The rubber block is positioned with the assembly area through upper and lower sides of the block-shaped main body and the two positioning protruding parts, and a front side surface of the block-shaped main body protrudes from the assembly area and faces the second end of the movable contact piece.

The base has a bottom portion, and a side of the bottom portion extends upward to form a side part. The assembly area comprises a groove provided on an inner side of the side part. The groove extends downward and penetrates a portion of the bottom portion; slots are respectively provided on the two inner side surfaces of the groove. A lower limiting protrusion is provided on a lower portion of the groove penetrating through one side of the bottom portion. When the rubber block is installed in the assembly area, a lower side surface of the block-shaped main body abuts against the lower limiting protrusion, and an upper side surface of the block-shaped main body abuts against the upper side of the groove. The front side surface of the block-shaped main body protrudes from an inner side surface of the side portion, and the two positioning protruding parts are respectively matched with the two slots. In this way, it is possible to make the assembly performance of the rubber block better and prevent the rubber block from falling off.

In an embodiment, the abdicating through hole is covered by a cover plate. The cover plate is connected with the base and also covers a portion of the fixed contact pieces. A first glue injecting tank is arranged on the cover plate. A plurality of penetration holes are arranged in the first glue injecting tank, and each of the penetration holes is in communication with one of surfaces of the fixed contact piece; a second glue injecting tank is formed between a part of edges of the cover plate and the base. The second glue injecting tank is in communication with the first glue injecting tank, a glue filled in the second glue injecting tank seals the cover plate and the base, and a glue filled in the first glue injecting tank and plurality of penetration holes fixes the fixed contact pieces. In this way, it is possible to protect the movable contacts and the fixed contacts better and prolong the service life of the relay.

In an embodiment, the penetration hole is a circular hole. A plurality of the penetration holes are divided into two parts, and a distance between the adjacent ones of the penetration holes of each part is smaller than a diameter of the penetration hole, in order to ensure enough glue immersed between the cover plate and the fixed contact piece.

In an embodiment, a first glue filling space is formed among the inner side surface of the plate-shaped base of the fixed contact piece. The base and the casing. A glue injection through hole is provided in the middle of the plate-shaped base. A glue storage area is provided at the base facing to the glue injection through hole and is in communication with the first glue filling space. A plurality of first exhaust slots are arranged at the casing facing to the plate-shaped base, each of the first exhaust slots is in communication with the first glue filling space. In this way, it is possible to fill the glue at the connection between the base and the casing covered by the fixed contact piece to seal, so as to further improve the performance of the relay.

In an embodiment, a first glue injection area and a second glue injection area are respectively formed among two sides of the plate-shaped base. The base and the casing, and the first glue injection area and the second glue injection area are both in communication with the first glue filling space. In this way, it is ensured to fill the glue in the first glue filling space.

In an embodiment, two abdicating through holes are provided in the base. The two fixed contact pieces are presented in a symmetrical structure and connected to the base. The fixed contact fixing part on each of the two fixed contact pieces extends through the abdicating through hole and located between the base and the casing; a lower end surface of the casing is parallel to an upper end surface of the casing, and when the casing is connected to the base. The plate-shaped base of the fixed contact piece is parallel to the upper end surface of casing, and a distance between the lower end surface of the plate-shaped base of the fixed contact piece and the upper end surface of the casing is smaller than a distance between the lower end surface and the upper end surface of the casing. In this way, it is possible on the one hand to make the structure arrangement more reasonable, on the other hand to protect the fixed contact pieces and prevent the plate-shaped bases of the two fixed contact pieces from contacting the conductor to form conduction.

In an embodiment, an end of the base is connected to an interface shell. An interface slot is arranged in the interface shell. Four conductive pins are embedded in the base and are electrically insulated from each other. A plug-in part is provided on an end of each of the conductive pins. The four plug-in parts are parallel to each other, and four matching through holes are arranged on a bottom portion of the interface slot, and the plug-in part is inserted into the interface slot through the matching through hole; and the other end of the conductive pin is electrically connected with the fixed contact piece or a connection end of the coil. In this way, a control interface or a management interface can be formed to facilitate connecting the external cables.

In an embodiment, two positioning protruding parts extend outward from a side end surface of the base. Four conductive pins are between the two positioning protruding parts. Positioning holes are respectively arranged on each of two sides of the interface slot of the interface shell. Each of the positioning protruding parts has a hook. The positioning protruding part is inserted into the positioning hole. The hook of the positioning protruding part is snapped on the outer side surface of the interface shell. A limiting end surface is arranged on one side of the interface shell close to the base; and the limiting end surface cooperates with the side end surface of the base for limiting position. In this way, the interface housing can be conveniently positioned and fixedly connected with the base, and the assembly performance is also better.

In an embodiment, the conductive pins electrically connected to the fixed contact piece are first conductive pins. Two first fitting slots are provided on the outer side surface of the base. The first conductive pin is fitted to the first fitting slot, and the first fitting slot restricts the first conductive pin from moving along a plug-in direction of the plug-in part. A first conductive snapping part is provided on the first conductive pin and is perpendicular to the plug-in part. A snapping through hole is provided on the plate-shaped base of the fixed contact piece, and the first conductive snapping part is in contact with the snapping through hole. The conductive pins electrically connected with one end of the coil are second conductive pins. Two second fitting slots are provided on the inner side surface of the base, and each of the second conductive pins is fitted to the second fitting slot that restricts the second conductive pin from moving along a plug-in direction of the plug-in part. A second conductive snapping part is provided on each of the second conductive pins and is perpendicular to the plug-in part. A conductive slot is provided on the second conductive snapping part. The bobbin is connected to two coil enameled wire connecting pins; each of the coil enameled wire connecting pin has an enameled wire winding part and a snap fitting part, and the enameled wire wiring part is wound with one end of the coil enameled wire to form an electrical connection; and the snap fitting part of the coil enameled wire connecting pin is snapped into the conductive slot on the second conductive snapping part to form an electrical connection. In this way. The first conductive pin and the second conductive pin are respectively embedded in the inner and outer side surfaces of the base to form high and low voltage insulation isolation; on the other hand. The embedded groove of the base has a limiting effect on the first conductive pin and the second conductive pin, to prevent the first conductive pin and the second conductive pin from being loosen and improve the reliability of the plug-in connection, and also improve the reliability of the electrical connection between the first conductive pin and the fixed contact piece, and improve the reliability of the electrical connection between the second conductive pin and the coil enameled wire connecting pin.

In an embodiment, a U-shaped groove is arranged at an end of the first conductive snapping part. Two outer side surfaces of the first conductive snapping part and two inner side surfaces of the snapping through hole form an interference fit; and a chip removing slot is provided on a lower portion of each of two sides of the first conductive snapping part, in order to ensure that the first conductive snapping part can be assembled in place, and to ensure the electrical connection performance between the first conductive pin and the fixed contact piece.

In an embodiment, a second glue filling space is formed between a side of the interface shell and the casing; a glue injecting tank is provided on each of two sides of the interface slot of the interface shell, and is in communication with the second glue filling space. A plurality of second exhaust slots are provided on a side of the casing facing to the interface shell, and each of the second exhaust slots is in communication with the second glue filling space, in order to improve the sealing performance entirely.

In an embodiment, the plug-in part is parallel to an axial direction of the coil, and the inner surface of the matching through hole is in contact with the plug-in part that has passed through to assist supporting the plug-in part, so that the plug-in part has better support performance and is easy to be arranged.

In an embodiment, the electromagnetic relay further comprises four conductive lead-out members. Each of which is provided with a snapping part and a welding part. The snapping part and the welding part are connected by a bending part. The welding part has a welding end surface. The conductive lead-out members are electrically insulated from each other. Four conductive pins are embedded in the base, one electrical connecting part is provided on one end of each of the conductive pins. The four electrical connecting parts are parallel to each other and located at one end of the base, and the conductive pins are electrically insulated from each other. An abdicating through hole is arranged at the casing close to the electrical connecting part. The snapping part of the conductive lead-out passes through the abdicating through hole to snap one of the electrical connecting parts so as to realize an electrical connection. The welding part of the conductive lead-out is outside the casing, and welding end surfaces of the welding parts of the conductive lead-out member are on the same plane. When the electromagnetic relay is installed. The welding part is welded with an external circuit board patch pad by means of the welding end surface, wherein the other ends of the two conductive pins are electrically connected to the two fixed contact pieces, respectively; and the other ends of the other two conductive pins are electrically connected to both ends of the coil, respectively. In this way, the electromagnetic relay can be directly attached to the circuit board, and it is easy to realize the automatic assembly operation.

In an embodiment, the conductive lead-out member is U-shaped and has two snapping parts and one welding part, and each of the two snapping parts is perpendicular to the welding part. Two abdicating through holes are provided at the casing close to the electrical connecting part, and the two snapping parts on each of the conductive lead-out members respectively pass through the two abdicating through holes to be snapped on the electrical connecting part. In this way, as long as one of the two snapping parts can be reliably and electrically connected to the electrical connecting part. The normal operation can be ensured, so as to improve the reliability of the electrical connection; and in addition. The stability of the connection can also be improved by simultaneously snapping the two snapping parts on the electrical connecting part.

In an embodiment, a shoulder is provided on the snapping part on each of the conductive lead-out members and cooperates with the inner side surface of the casing to prevent the snapping part of the conductive lead-out member from being separated from the electrical connecting part on the conductive pin, in order to form an anti-retraction structure to prevent the conductive lead-out from falling off.

In an embodiment, a snapping slot is provided on the snapping part on each of the conductive lead-out member, and the snapping part is snapped on the electrical connecting part by using the snapping slot to form an interference fit, so as to further improve the reliability of the electrical connection.

In an embodiment, a protruding part is provided on the base between the adjacent electrical connecting parts. A matching groove is provided at the inner side surface of the casing facing to the protruding part, and the protruding parts is matched with the matching groove to increase a creepage distance and an electrical clearance between the conductive lead-out members adjacent to each other; and the welding part of the conductive lead-out members are attached to the same outer side surface of the casing, so that a reliable electrical insulation between the high-voltage circuit and the low-voltage circuit can be ensured to further improve the safety of use.

The welding end surfaces of the welding parts of the conductive lead-out members are on the same plane, to facilitate assembly positioning and ensure that all welding end surfaces are on the same plane.

DETAILED DESCRIPTION

Figure 1:
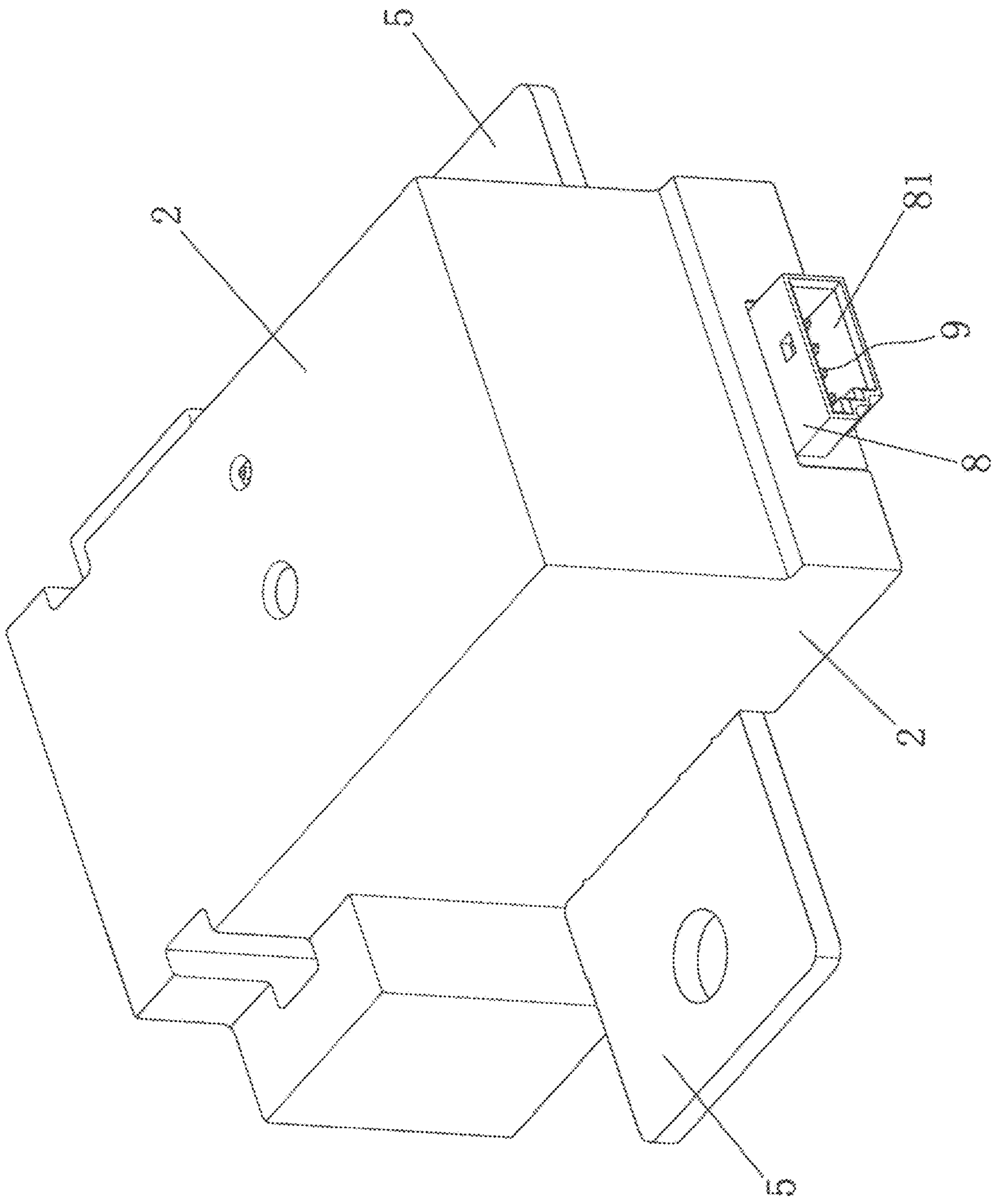
FIG. 1 is a top perspective view of a first embodiment of the present disclosure.
Figure 2:
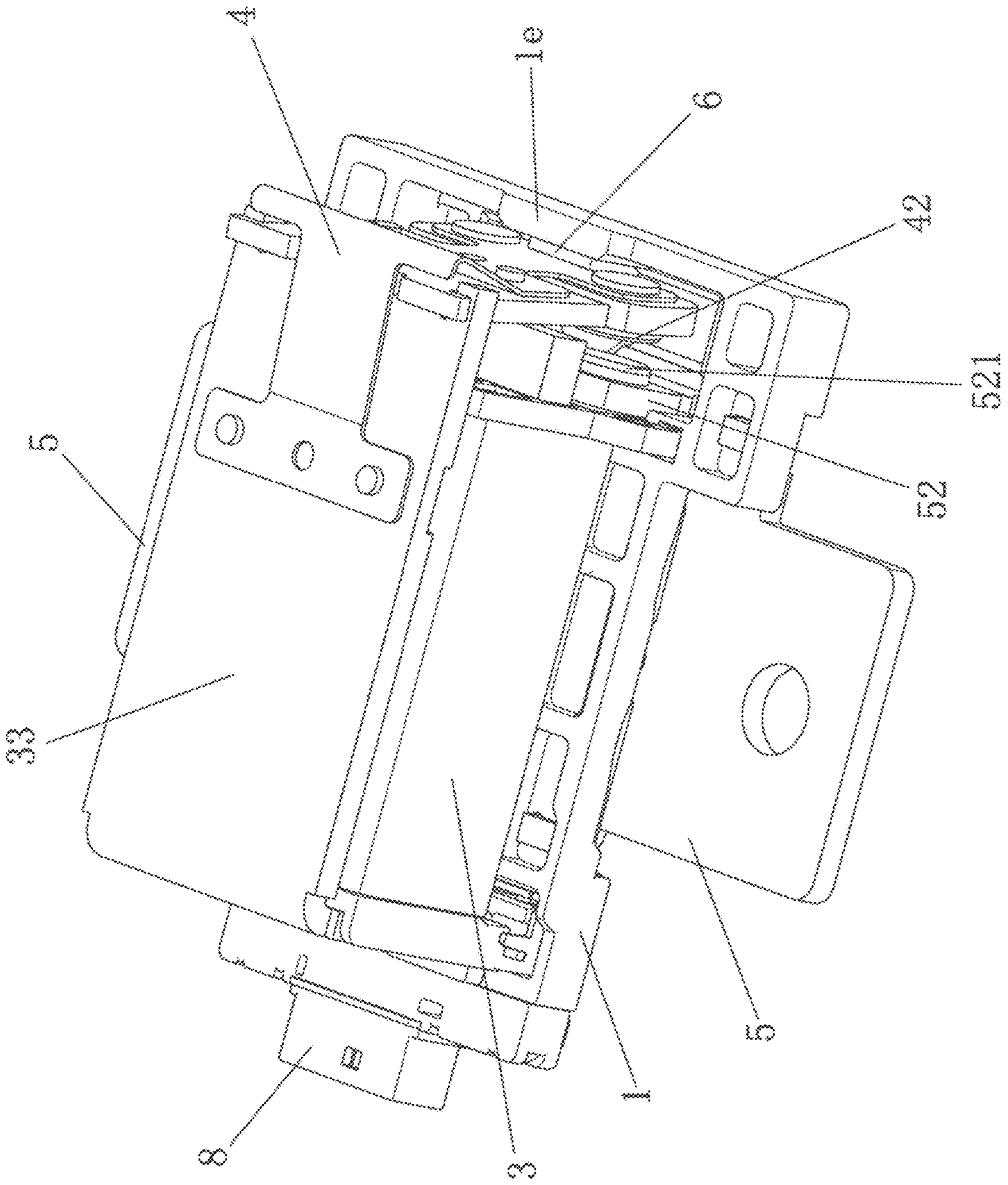
FIG. 2 is a top perspective view of the first embodiment of the present disclosure wherein the casing is hidden.
Figure 3:
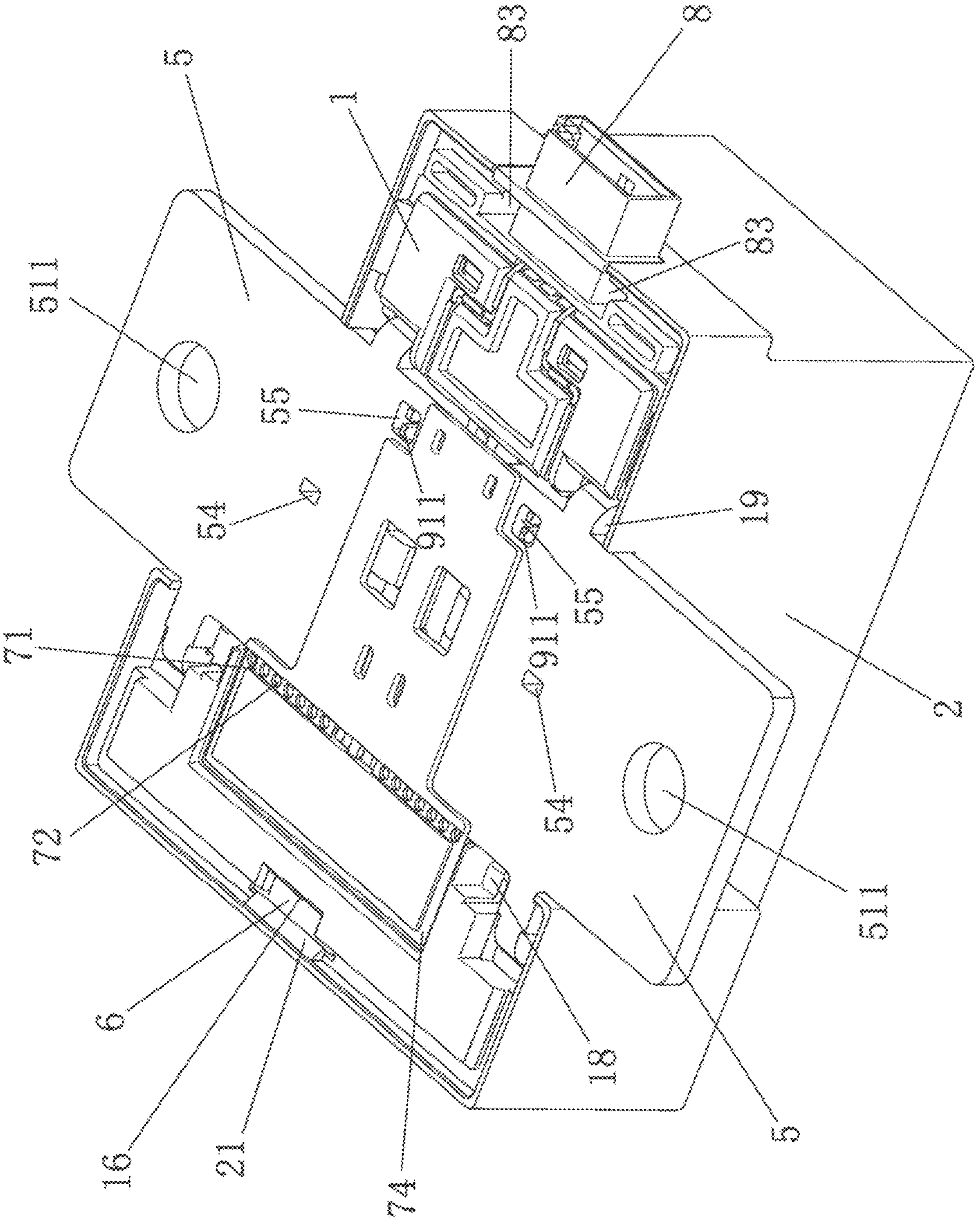
FIG. 3 is a bottom perspective view of the first embodiment of the present disclosure.
Figure 4:
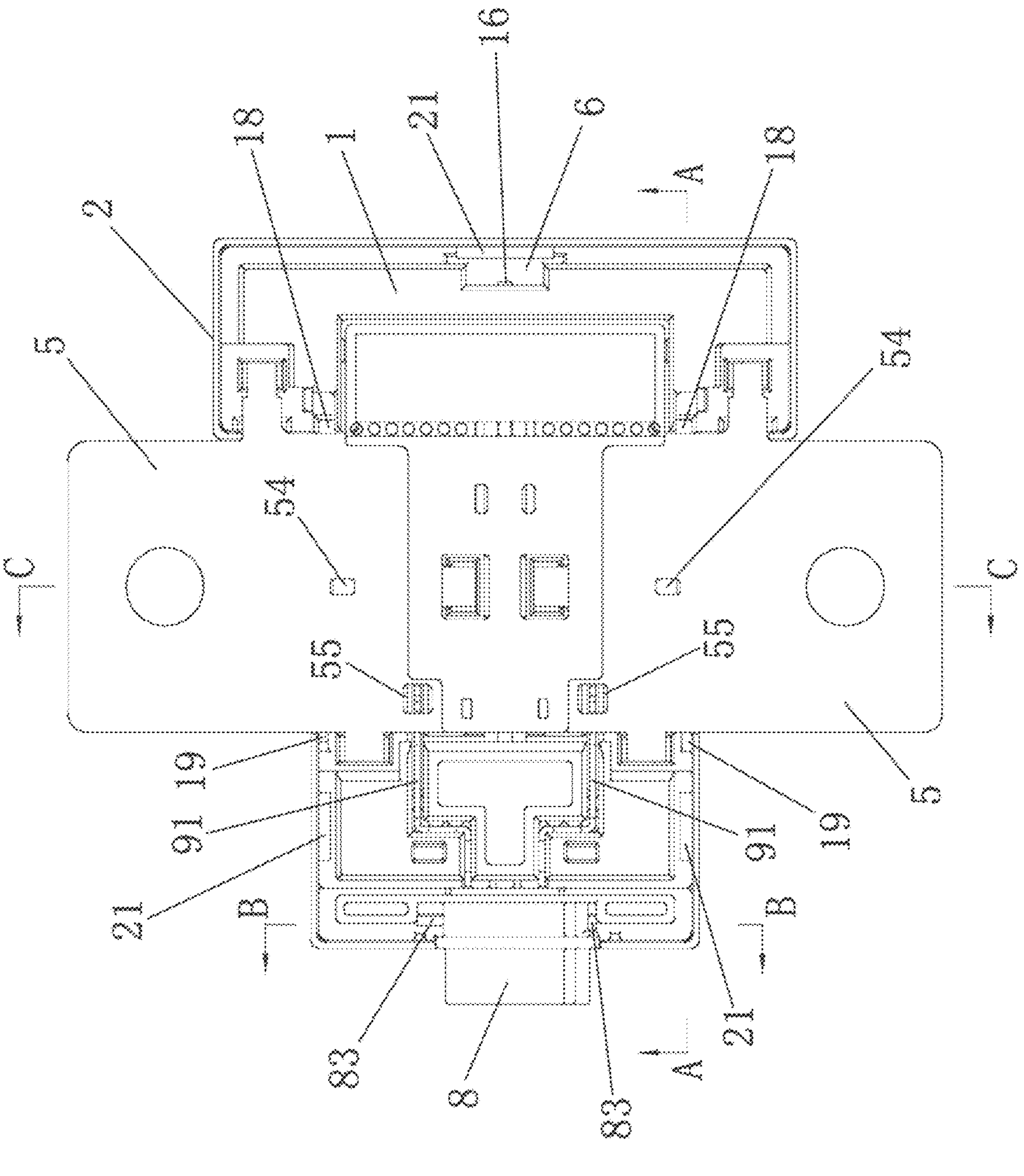
FIG. 4 is a bottom view of the first embodiment of the present disclosure.
Figure 5:
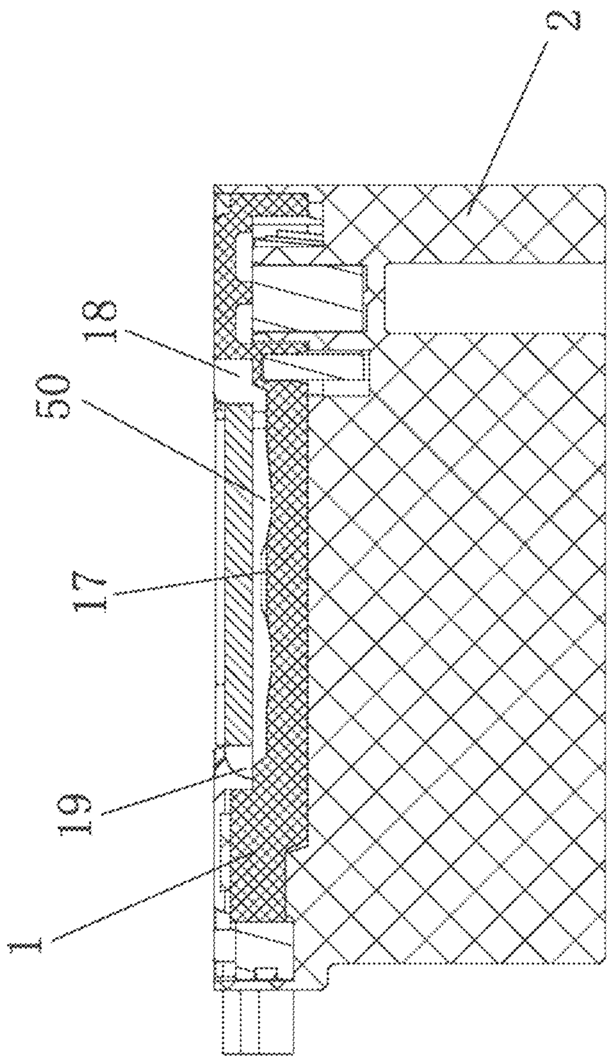
FIG. 5 is a A-A sectional view of FIG. 4.
Figure 6:
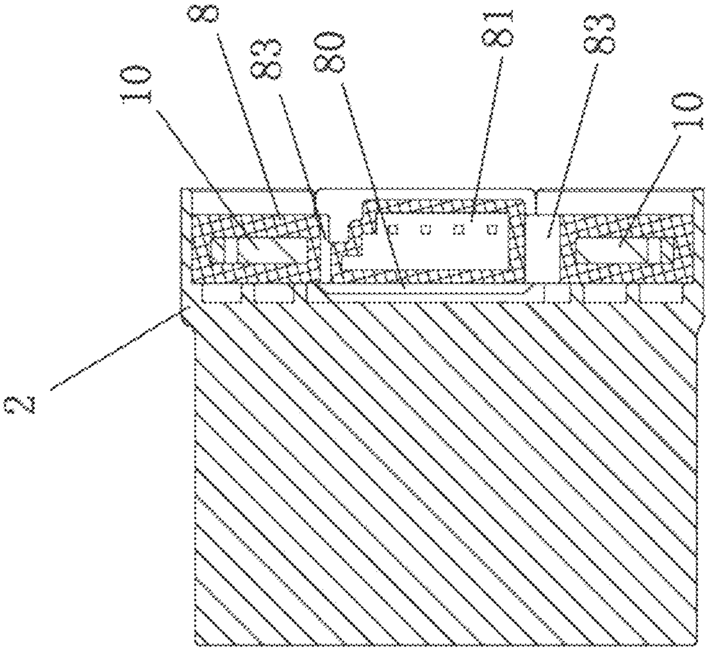
FIG. 6 is a B-B sectional view of FIG. 4.
Figure 7:
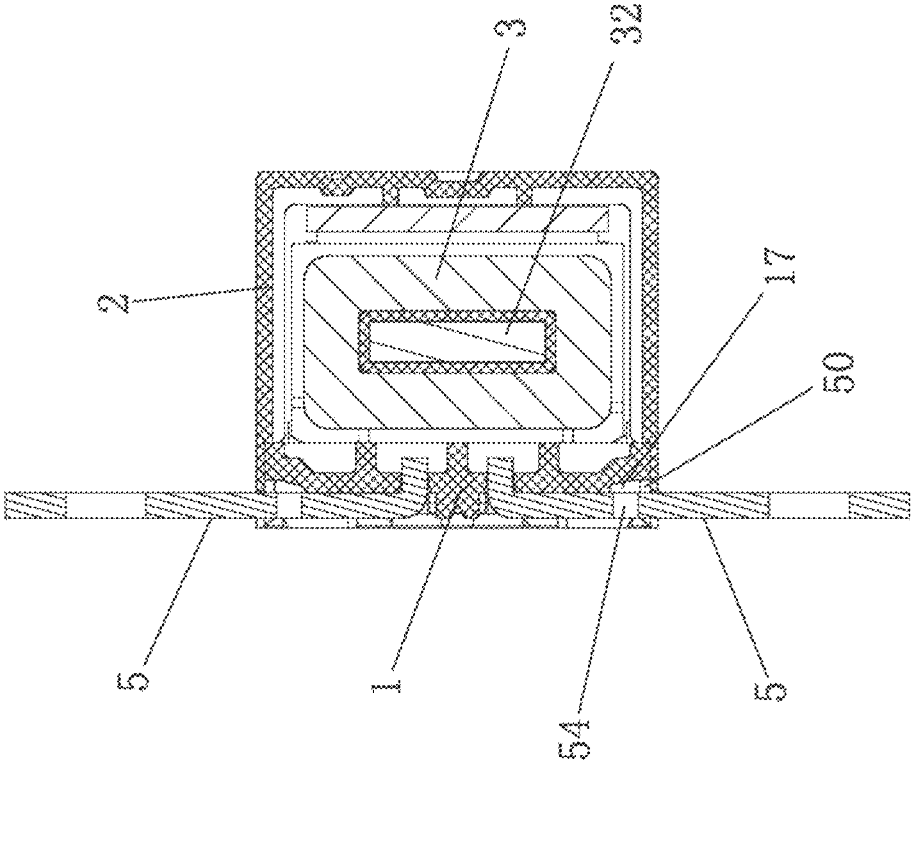
FIG. 7 is a C-C sectional view of FIG. 4.
Figure 8:
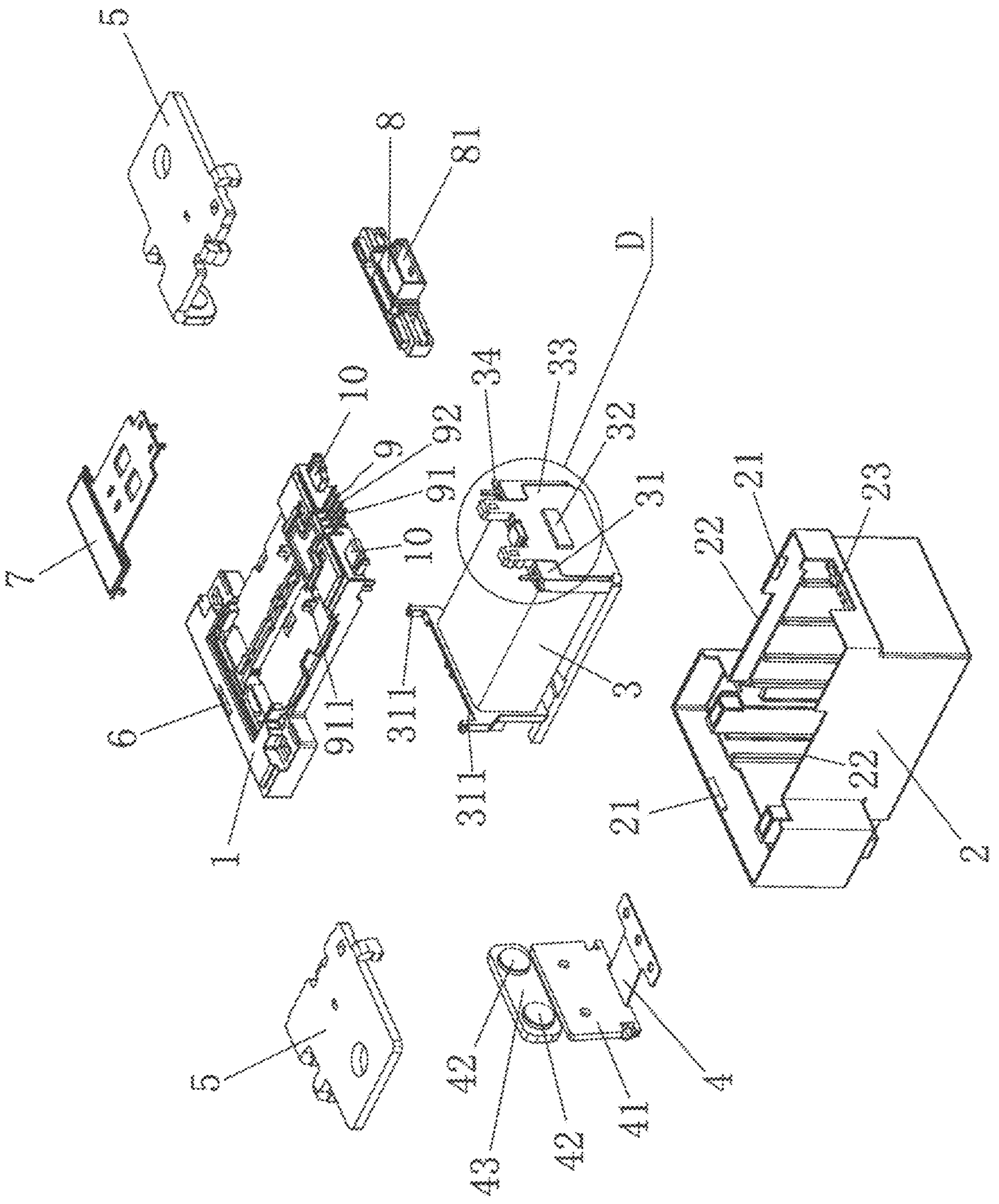
FIG. 8 is an exploded perspective view of the first embodiment of the present disclosure.
Figure 9:
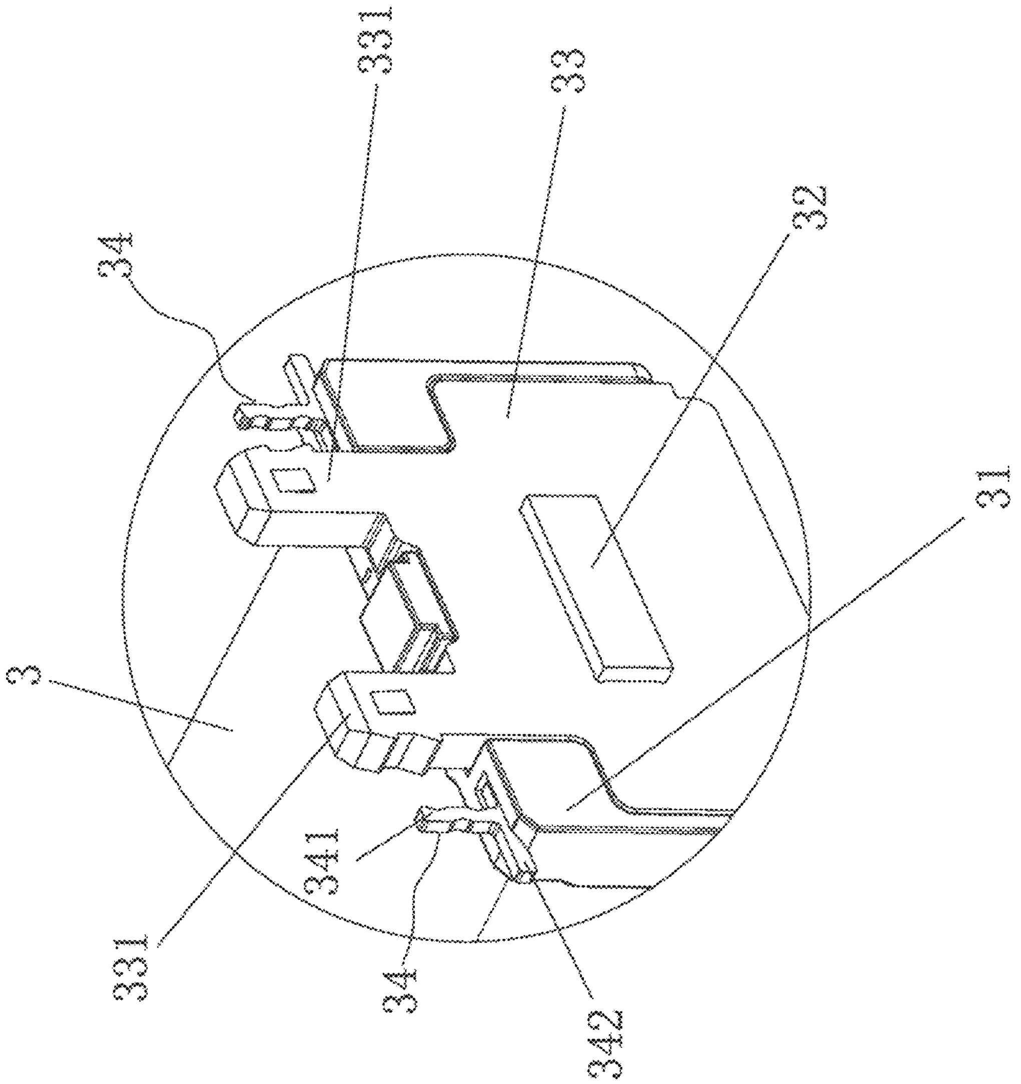
FIG. 9 is an enlarged view of D of FIG. 8.

Now, the exemplary implementations will be described more completely with reference to the accompanying drawings. However, the exemplary implementations can be done in various forms and should not be construed as limiting the implementations as set forth herein. Although terms having opposite meanings such as "up" and "down" are used herein to describe the relationship of one component relative to another component, such terms are used herein only for the sake of convenience, for example, "in the direction illustrated in the figure". It can be understood that if a device denoted in the drawings is turned upside down, a component described as "above" something will become a component described as "under" something. Other relative terms, such as "top", "bottom", etc., are also used to have similar meanings. When a structure is described as "above" another structure, it probably means that the structure is integrally formed on another structure, or, the structure is "directly" disposed on another structure, or, the structure is "indirectly" disposed on another structure through an additional structure.

Words such as "one", "an/a", "the" and "said" are used herein to indicate the presence of one or more elements/component parts/and others. Terms "including", and "having" have an inclusive meaning which means that there may be additional elements/component parts/and others in addition to the listed elements/component parts/and others. Terms "first" and "second" are used herein only as markers, and they do not limit the number of objects modified after them.

The present disclosure will be further described in detail below in conjunction with the accompanying drawings and specific embodiments.

The First Embodiment

As shown in FIGS. 1 to 18, an electromagnetic relay includes a base 1, a casing 2, a coil 3, one movable contact piece 4 and two fixed contact pieces 5. The casing 2 is connected with the base 1. Three stopping parts 21 are provided on a lower part of an inner side of the casing 2. The three stopping parts 21 block the base 1. The coil 3 is wound on a bobbin 31 which is connected with the base 1. The coil 3, the bobbin 31, and the movable contact piece 4 are between the base 1 and the casing 2. A core 32 is installed in a center hole of the bobbin 31. The yoke 33 is connected with the bobbin 31. The yoke 33 is L-shaped, and has one end connected with one side of the bobbin 31 and the other end in parallel to the coil 3. Two first snap feet 331 are provided on the one end of the yoke 33. Two second snap feet 311 are provided on a lower part of the other side of the bobbin 31. The base 1 is provided with two first snap holes 11 and two second snap holes 12 respectively at the facing positions thereof. The two first snap feet 331 are respectively matched with the two first snap holes 11, and the two second snap feet 311 are respectively matched with the two second snap holes 12, so that a fixed connection between the bobbin 31 and the base 1 is formed.

The movable contact piece 4 is bent along the middle portion thereof. The movable contact piece 4 has a first end and a second end opposite to the first end, and the first end is connected with the other end of the yoke 33 and the second end is connected with an armature 41. There are two movable contacts 42 on the second end of the movable contact piece 4, specifically, the second end of the movable contact piece 4 is first connected with a conductive plate 43, and the two movable contacts 42 are arranged on the conductive plate 43. The armature 41 faces to one end of the core 32, the other end of the core 32 is connected with the yoke 33. Each fixed contact piece 5 includes a plate-shaped base 51, and a portion of one side of the plate-shaped base 51 extends outward and is bent to form a fixed contact fixing part 52. The fixed contact fixing part 52 is perpendicular to the plate-shaped base 51 and is provided with a fixed contact 521. Two abdicating through holes 13 are arranged on the base 1. The two fixed contact pieces 5 are presented in a symmetrical structure and are connected to the outer side of the base 1 and spaced from each other respectively by using the plate-shaped base 51. Each fixed contact fixing part 52 protrudes between the base 1 and the casing 2 through one abdicating through hole 13, and each of the fixed contacts 521 faces to one movable contact 42 on the movable contact piece 4. The plate-shaped base 51 on each of the fixed contact pieces 5 partially protrudes out of the casing 2 to form a connecting part. The connecting part is connected with a load connection terminal by a connecting screw, and is provided with a connection through hole 511 through which the connecting screw passes. A lower end surface of the casing 2 is parallel to an upper end surface thereof. When the casing 2 is connected to the base 1, the plate-shaped base 51 of the fixed contact piece 5 is parallel to the upper end surface of the casing 2, and a distance between the lower end surface of the plate-shaped base 51 of the fixed contact piece 5 and the upper end surface of the casing 2 is smaller than a distance between the lower end surface of the casing 2 and the upper end surface of the casing 2. In this way, it is possible to protect the fixed contact piece 5, and also prevent the plate-shaped bases 51 of the two fixed contact pieces 5 from contacting a conductor to form conduction.

Portions of the three sides of the plate-shaped base 51 on each fixed contact piece 5 extends outward and are bent to form a riveting part 53, and the base 1 is provided with three facing riveting holes 14 for each fixed contact piece 5. Each riveting part 53 is fitted to the riveting hole 14 so that the plate-shaped base 51 is fixedly connected to the outer side of the base 1. This can facilitate assembly and improve assembly efficiency.

The base 1 is provided with an assembly area 15 on a side close to the second end of the movable contact piece 4, and the assembly area 15 is fixedly connected with a rubber block 6 that restricts a moving distance of the second end of the movable contact piece 4 when being rebound and reset and provides a buffering effect, so that noise can be better reduced.

Figure 10:
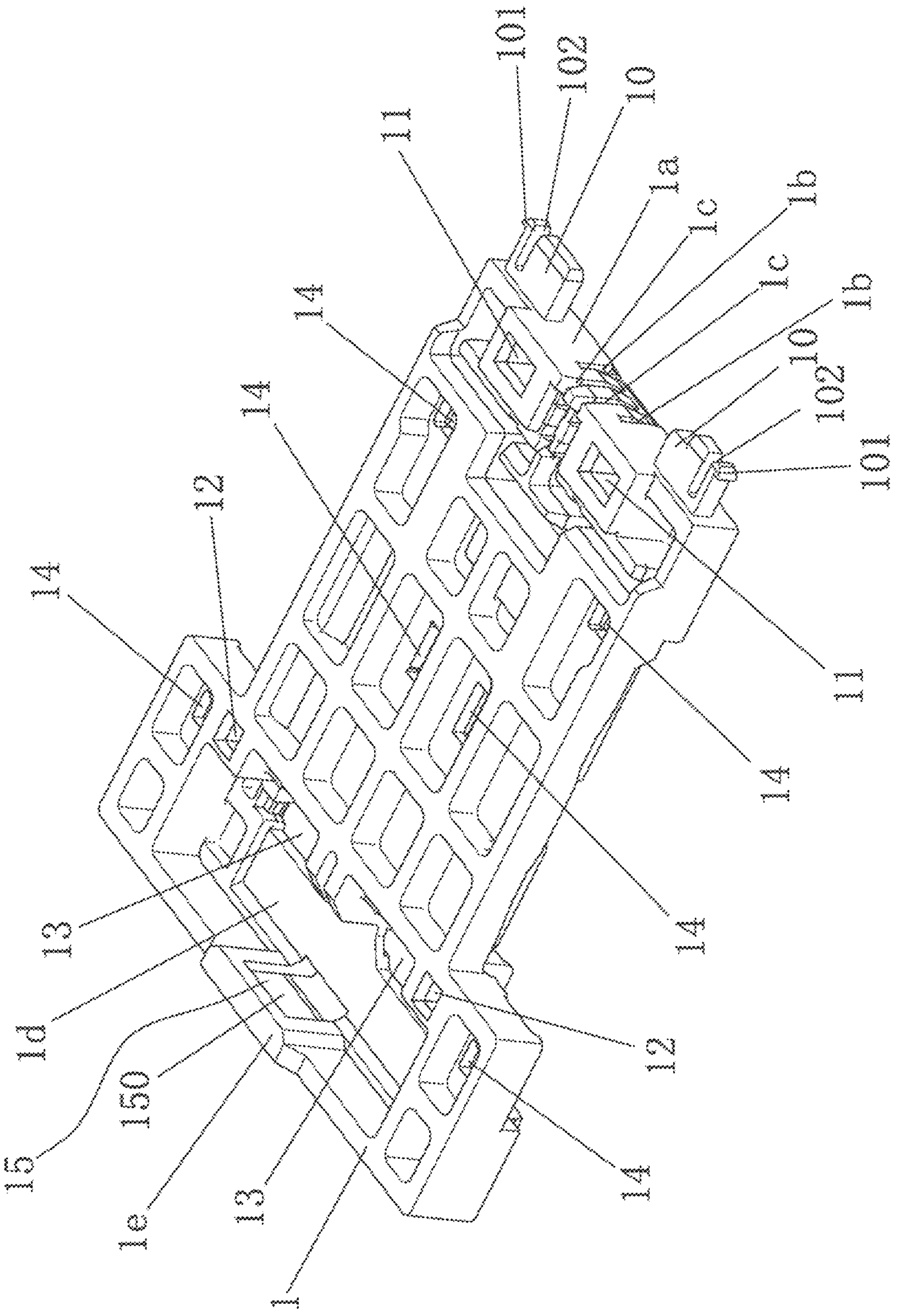
FIG. 10 is a top perspective view of a base of the first embodiment of the present disclosure.
Figure 11:
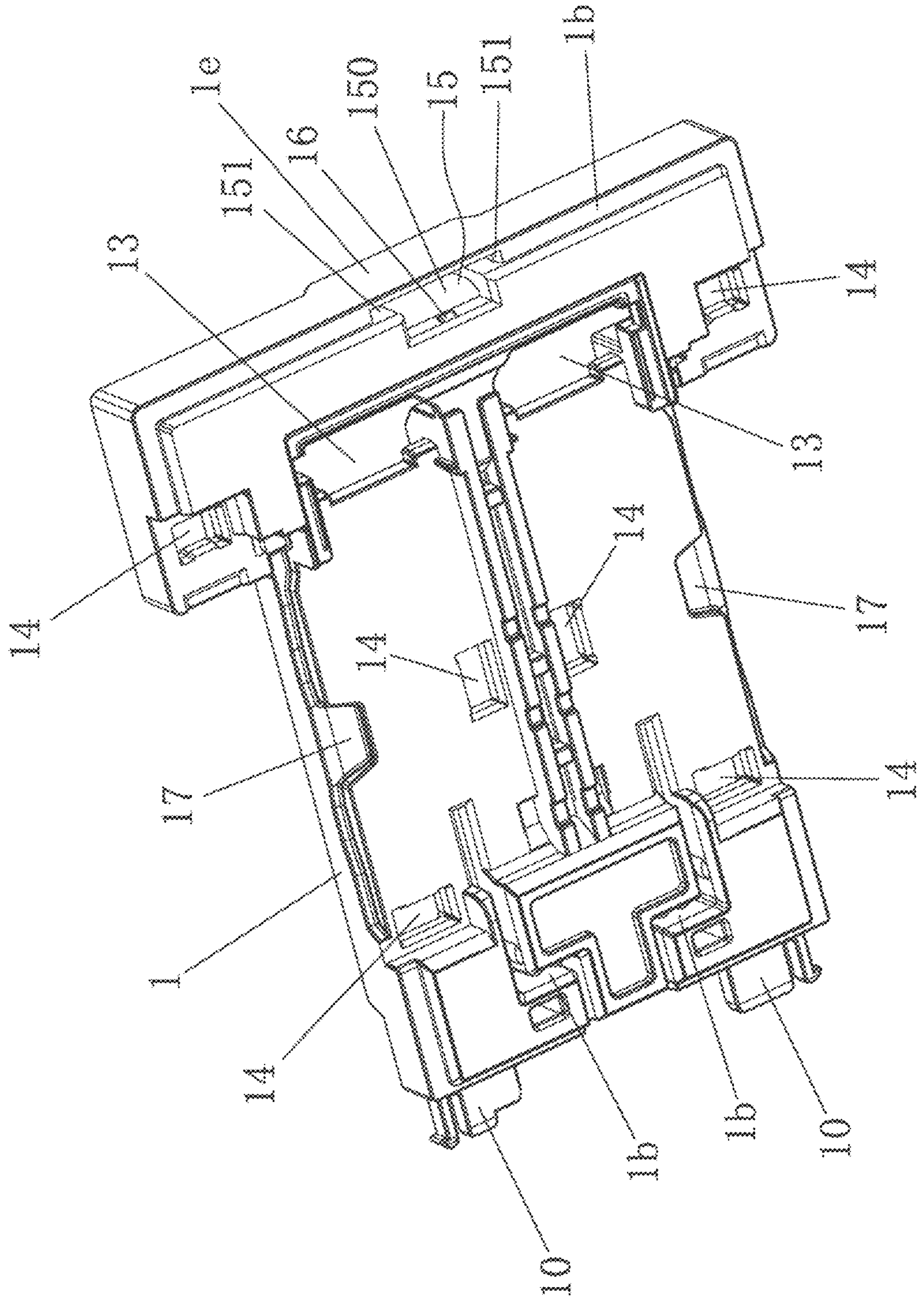
FIG. 11 is a bottom perspective view of the base of the first embodiment of the present disclosure.
Figure 12:
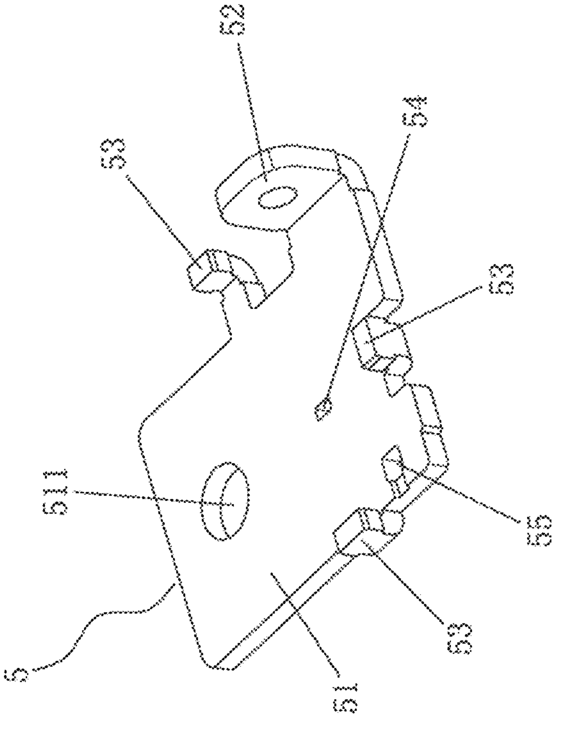
FIG. 12 is a perspective view of a fixed contact piece of the first embodiment of the present disclosure.
Figure 13:
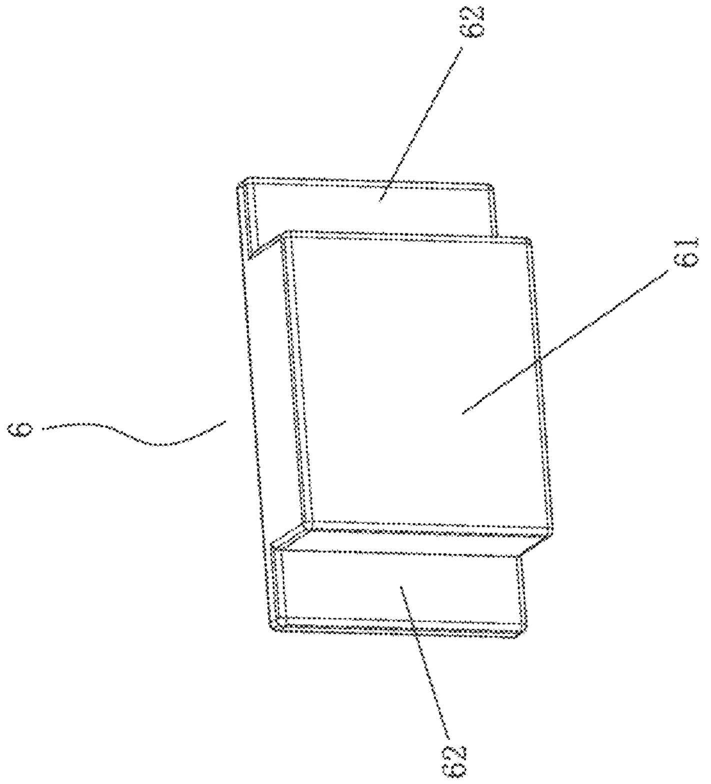
FIG. 13 is a perspective view of a rubber block of the first embodiment of the present disclosure.
Figure 14:
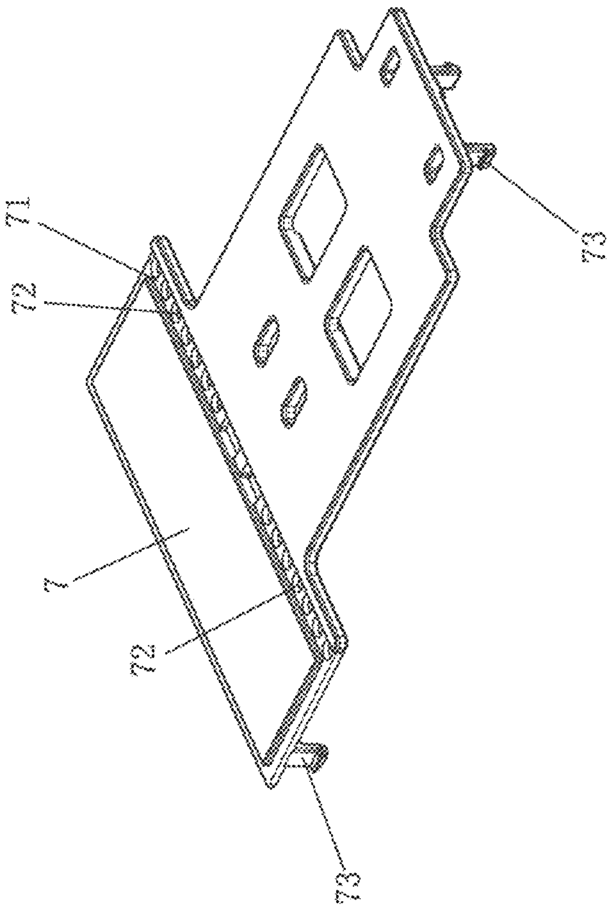
FIG. 14 is a perspective view of a cover plate of the first embodiment of the present disclosure.
Figure 16:
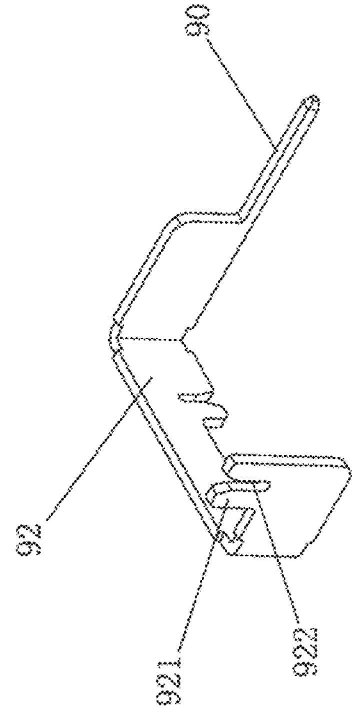
FIG. 16 is a perspective view of a second conductive pin of the first embodiment of the present disclosure.
Figure 15:
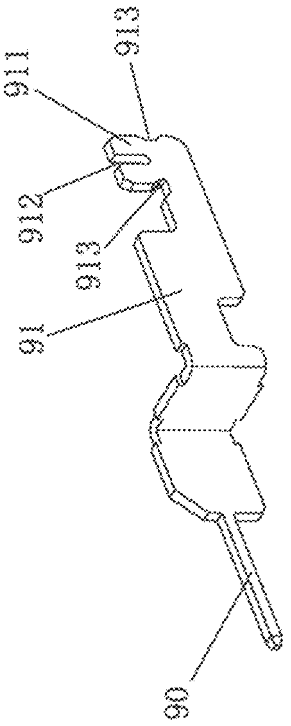
FIG. 15 is a perspective view of a first conductive pin of the first embodiment of the present disclosure.
Figure 18:
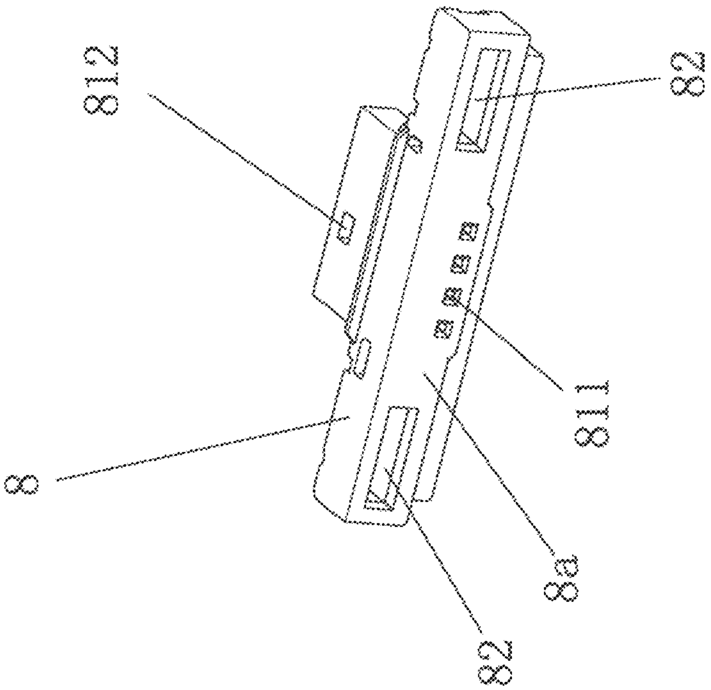
FIG. 18 is a perspective view of the interface shell of the first embodiment of the present disclosure from another angle.
Figure 17:
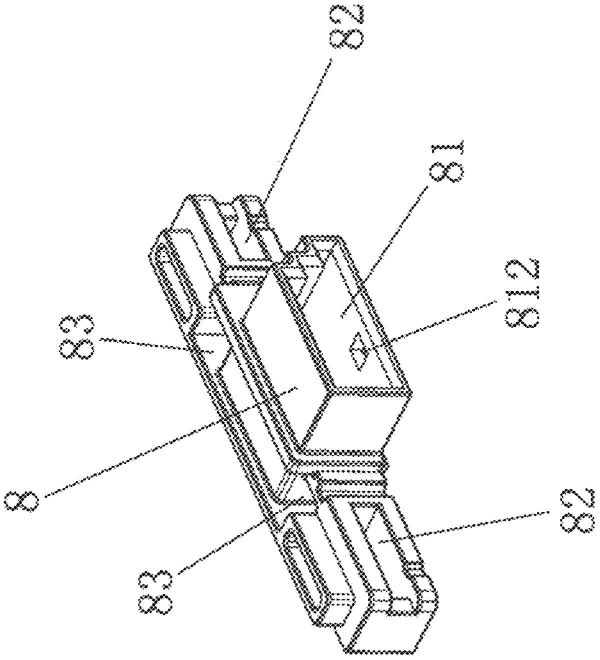
FIG. 17 is a perspective view of an interface shell of the first embodiment of the present disclosure.
Figure 19:
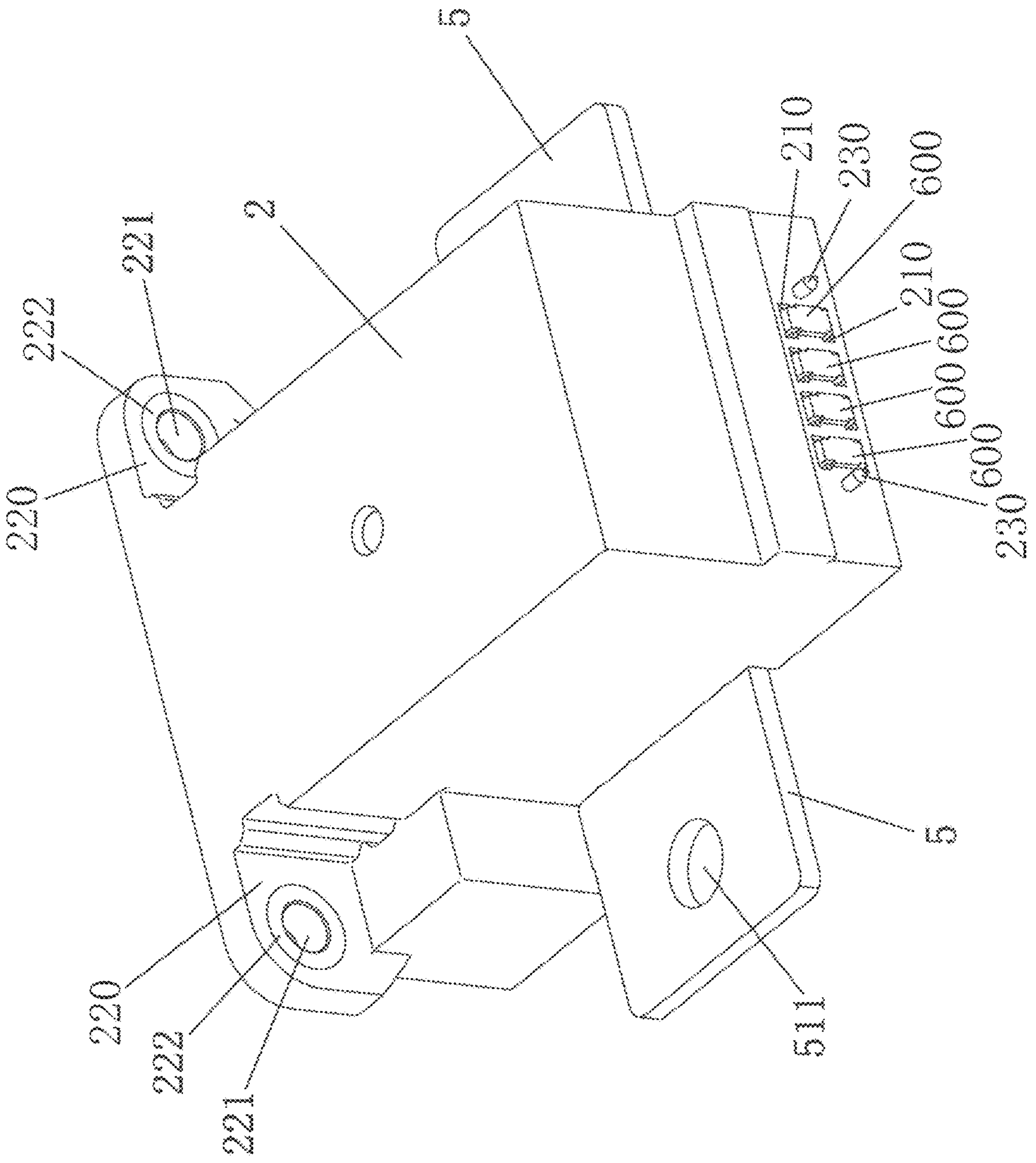
FIG. 19 is a top perspective view of a second embodiment of the present disclosure.
Figure 20:
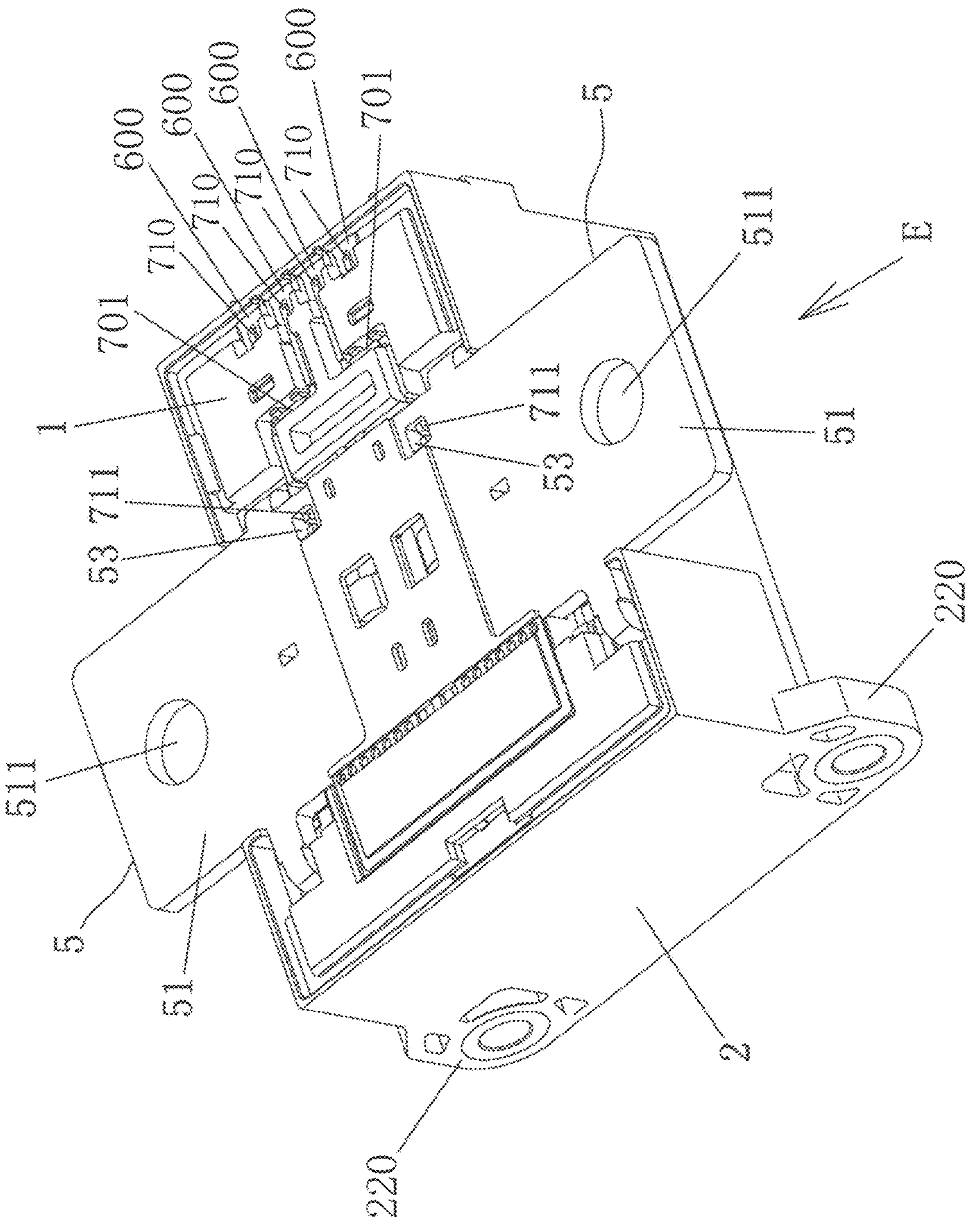
FIG. 20 is a bottom perspective view of the second embodiment of the present disclosure.
Figure 21:
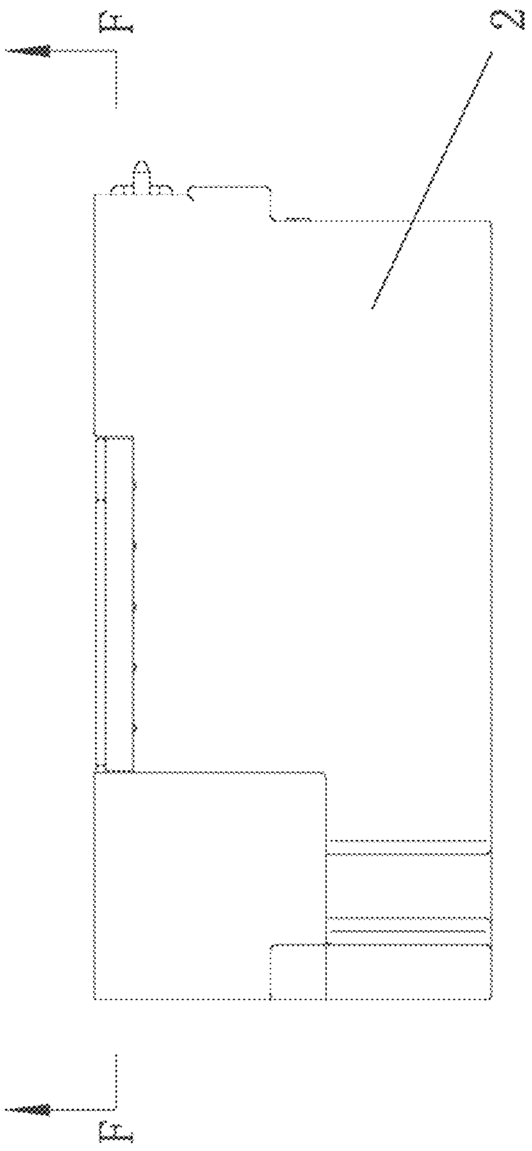
FIG. 21 is an E-direction view of FIG. 20.
Figure 22:
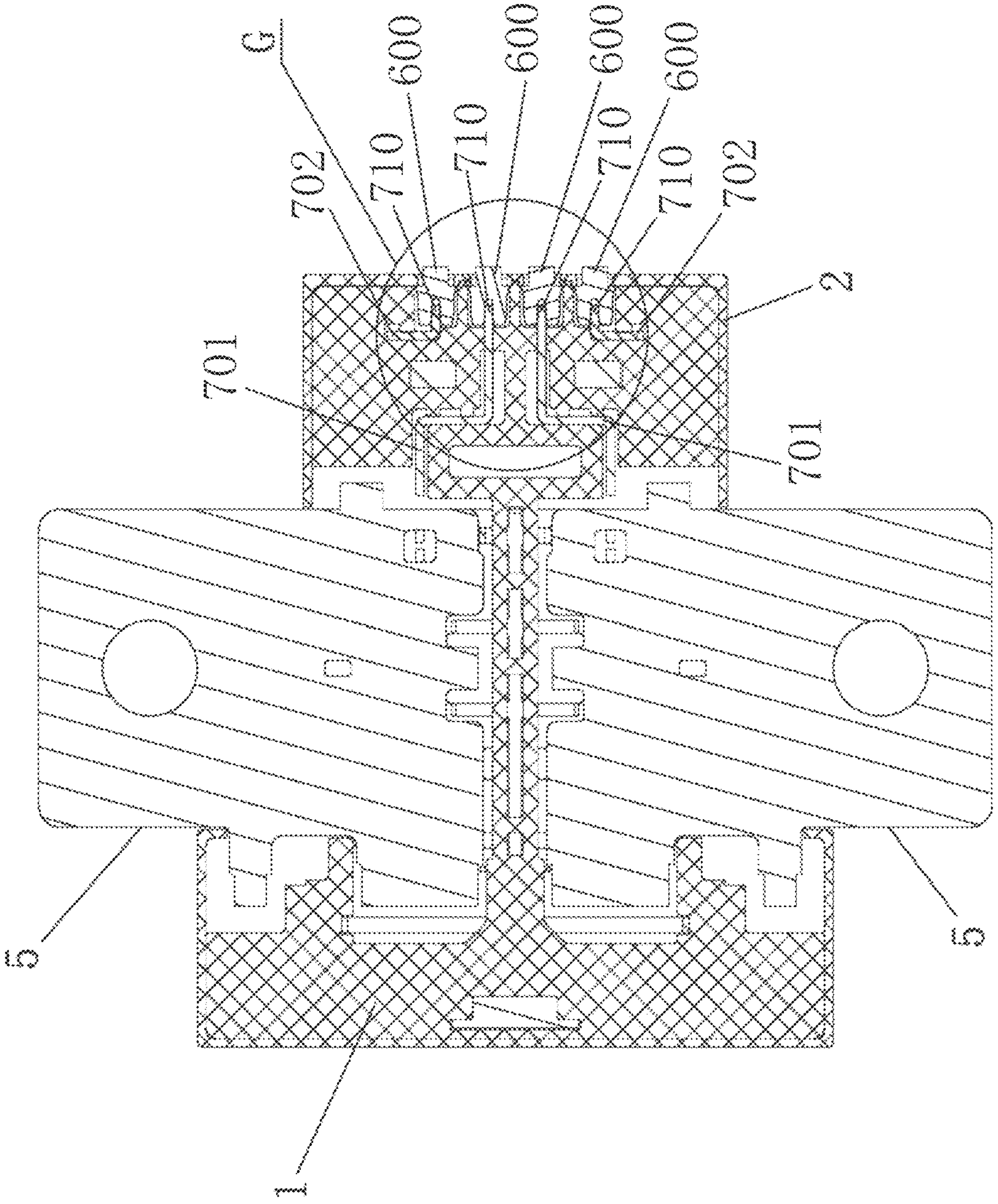
FIG. 22 is a F-F sectional view of FIG. 21.

Further referring to FIGS. 10, 11, and 13, the rubber block 6 includes a block-shaped main body 61 and positioning protruding parts 62 that extend outward from both sides of the block-shaped main body 61. The rubber block 6 is positioned with the assembly area 15 by the upper and lower sides of the block-shaped main body 61 and the two positioning protruding parts 62. The front side of the block-shaped main body 61 protrudes from the assembly area 5 and faces to the second end of the movable contact piece 4.

The structure of the assembly area 15 is configured as follows: the base 1 is provided with a bottom part 1*d*, a side of the bottom part 1*d* extends upward to form a side part 1*e*; and the assembly area 15 includes a groove 150 arranged on an inner side of the side part 1*e*. The groove 150 extends downward and penetrates through a portion of the bottom part 1*d*; a slot 151 is provided on each of the two inner side surfaces of the groove 150, and a lower limiting protrusion 16 is provided on the lower portion of the side of the groove 150 penetrating through the bottom part 1*d*; when the rubber block 6 is installed in the assembly area 15, the lower side surface of the block-shaped body 61 abuts against the lower limiting protrusion 16, and the upper side surface of the block-shaped body 61 abuts against the upper side of the groove 150; and the front side surface of the block-shaped main body 61 protrudes from the inner side surface of the side part 1*e*, and the two positioning protruding parts 62 are matched with the two slots 151, respectively.

The two positioning protruding parts 62 are also fastened to the two slots 151 by a glue.

When the casing 2 is connected to the base 1, a limiting part 21 on the casing 2 also blocks the lower side surface of the block-shaped main body 61 of the rubber block 6, and the lower limiting protrusion 16 and the limiting part 21 jointly prevent the rubber block 6 from falling out of the base 1.

The two abdicating through holes 13 are covered by a cover plate 7. The cover plate 7 also covers a part of each fixed contact piece 5. The cover plate 7 is provided with a first glue injecting tank 71 on which a plurality of penetration holes 72 are provided, and each of the penetration holes 72 is in communication with a surface of one of the fixed contact pieces 5. The glue can easily flow between the outer surface of the fixed contact piece 5 and the inner surface of the cover plate 7 through the penetration holes 72, so as to improve a sealing effect.

In an embodiment, the penetration hole 72 is a circular hole, a plurality of the penetration holes 72 are divided into two parts, and a distance between the adjacent penetration holes 72 in each part is smaller than a diameter of the penetration hole 72. The cover plate 7 is provided with four hooks 73, two of which are hooked on the base 1, and the other two of which are respectively hooked on the plate-shaped bases 51 of the two fixed contact pieces 5, so that the cover plate 7 is connected to the base 1.

When the cover plate 7 is connected to the base 1, a second glue injecting tank 74 is formed between part of the edges of the cover plate 7 and the base. The second glue injecting tank 74 is in communication with the first glue injecting tank 71. A glue is dispensed in the second glue injecting tank 74 to seal the cover plate 7 and the base 1. A glue is filled in the first glue injecting tank 71 and plurality of penetration holes fixes the fixed contact pieces 5 and the cover plate. Thus the periphery of the two abdicating through holes 13 are sealed to the cover plate 7, so as to better protect the movable contacts 42 of the movable contact piece 4 and the fixed contacts 521 of the fixed contact piece 5 from oxidation and corrosion of the external gas, thereby improving the service life.

A first glue filling space 50 is formed among an inner side surface of the plate-shaped base 51 of each fixed contact piece 5, the base 1 and the casing 2. A glue injection through hole 54 is provided in the middle of the plate-shaped base 51. A glue storage area 17 is provided at a position of the base 1 facing to the glue injection through hole 54. The glue storage area 17 is in communication with the first glue filling space 50. A plurality of first exhaust slots 22 are provided at a position of the casing 2 facing to the plate-shaped base 51, and each first exhaust slot 22 is in communication with the first glue filling space 50. The arrangement of the first exhaust slots 22 prevents gas from being accumulated in the first glue filling space 50 and prevents the gas from hindering the flow of the glue.

The base 1 is provided with a first glue injection area 18 and a second glue injection area 19 on both sides of each of the plate-shaped bases 51 respectively, and both the first glue injection area 18 and the second glue injection area 19 are in communication with the first glue filling space 50.

By injecting glue into the glue injection through hole 54, the first glue injection area 18 and the second glue injection area 19, the glue is quickly filled into the first glue filling space 50 for sealing. The glue from the glue injection through hole 54 first reaches the glue storage area 17, and then flows into the first glue filling space 50 from the glue storage area 17.

One end of the base 1 is connected to an interface shell 8. The interface shell 8 is provided with an interface slot 81. A side end surface 1*a* of the base 1 extends outward to the two positioning protrusions 10, on each of which a hook 101 is provided. A positioning hole 82 is provided on each of the two sides of the interface slot 81 of the interface shell 8. Each positioning protrusion 10 is inserted into a positioning hole 82, and the hook 101 of the positioning protrusion 10 is clamped on the outer side of the interface shell 8. The interface shell 8 is provided with a limiting end surface 8*a* on the side close to the base 1, and the limiting end surface 8*a* is in cooperation with the side end surface 1*a* of the base 1 to limit the position.

An abdicating slot 102 is provided at each of the positioning protrusions 10 close to the hook 101, and the abdicating slot 102 allows the deformation of the hook 101 to make a way for assembling the hook 101, to facilitate for assembling.

There are four conductive pins 9 embedded in the base 1, and are electrically insulated from each other. The four conductive pins 9 are located between the two positioning protrusions 10. There is a plug-in part 90 on an end of the conductive pin. Four plug-in parts 90 are parallel to each other in an axial direction of the coil 3. There are four matching through holes 811 on the bottom of the interface slot 81. The plug-in part 90 passes through the matching through hole 811 into the interface slot 81, and the inner surface of the matching through hole 811 is in contact with the plug-in part 90 to support the plug-in part 90, and the other end of the conductive pin 9 is electrically connected to the fixed contact piece 5 or the connection end of the coil 3.

The conductive pin 9 electrically connected to the fixed contact piece 5 is a first conductive pin 91. Two first fitting slots 1*b* are provided on the outer side surface of the base 1. The first conductive pin 91 is fitted to the first fitting slot 1*b*. The first fitting slot 1*b* restricts the movement of the first conductive pin 91 along a direction of plugging the plug-in part 90. A first conductive snapping part 911 is provided on the other end of the first conductive pin 91, the first conductive snapping part 911 is perpendicular to the plug-in part 90. There is a snap through hole 55 on the plate-shaped base 51 of the fixed contact piece 5, and the first conductive snapping part 911 is connected to and fitted to the snap through holes 55.

There is a U-shaped groove 912 provided at an end of the first conductive snapping part 911, an interference fit is formed between the two outer side surfaces of the first conductive snapping part 911 and the two inner side surfaces of the snap through hole 55. In this way, a better electrical connection effect can be formed, and the U-shaped groove 912 can provide an abdicating space for the deformation of the first conductive snapping part 911, in order for assembly.

A chip removing slot 913 is provided on the lower part of the two sides of the first conductive snapping part 911. During assembly, metal chips generated by the interference fit between the fixed contact piece 5 and the first conductive snapping part 911 can be accumulated at the chip removing slot 913, to avoid rebounding caused by improper assembly or metal chips accumulated here after assembly.

The conductive pin 9 electrically connected to one end of the coil 3 is a second conductive pin 92. The two second conductive pins 92 are located between the two first conductive pins 91 and are fitted to the inner side surface of the base 1. There are two second fitting slots 1*c* on the inner side surface of the base 1. The second conductive pin 92 is fitted to the second fitting slot 1*c* that restricts the movement of the second conductive pin 92 along a direction of plugging the plug-in part 90.

There is a second conductive snapping part 921 on the second conductive pin 92. The second conductive snapping part 921 is perpendicular to the plug-in part 90. A conductive slot 922 is provided on the second conductive snapping part 921. The bobbin 31 is connected with two coil enameled wire connecting pins 34. Each coil enameled wire connecting pin 34 is provided with an enameled wire winding part 341 and a fitting part 342. The enameled wire winding part 341 is wound with one end of the enameled wire of the coil 3 to form an electrical connection, and the fitting part 342 of the coil enameled wire connecting pin 34 is snapped into the conductive slot 922 on the second conductive snapping part to form an electrical connection. The two outer side surfaces of the fitting part 342 of the coil enameled wire connecting pin 34 is in contact with and fit to the two inner side surfaces of the conductive slot 922.

When the casing 2 is connected to the base 1, a second glue filling space 80 is formed between one side of the interface shell 8 and the casing 2. There are glue injecting tanks 83 respectively provided on the two sides of the interface slots 81 of the interface shell 8. The glue injecting tank 83 is in communication with the second glue filling space 80. A plurality of second exhaust slots 23 are provided on one side of the casing 2 facing to the interface shell 8, and each second exhaust slot 23 is in communication with the second glue filling space 80. By injecting glue through the two glue injecting tanks 83, the glue fills the second glue filling space 80 to achieve the sealing effect. The plurality of the second exhaust slots 23 are provided to prevent gas from accumulating in the second glue filling space 80 and prevent the gas from hindering the flow of the glue.

A snap through hole 812 matched with an external plug is provided on the inner side surface of the interface slot 81 on the interface shell 8. When the external plug is inserted into the interface slot 81, the snap through hole 812 matches with the snap protrusion on the external plug in order to prevent the external plug from coming out of the interface slot 81.

In this embodiment, the connecting part of the plate-shaped base 51 of the fixed contact piece 5 protruding out of the casing 2 is connected to a load connection terminal through a connecting screw, and the interface slot 81 is plugged into the external plug. A control power supply is introduced through the external plug to energize the coil 3 through the two second conductive pins 92, and the generated magnetic force attract the armature 41 to one end of the core 32, and the two fixed contacts 521 are connected to the two movable contacts 42 of the movable contact piece 4 simultaneously. In the state of the two fixed contact pieces 5 being communicated with each other, signals are transmitted to the outside via the external plug through two first conductive pins 91. When the external control power supply is turned off, the magnetic force disappears, the armature 41 is separated from one end of the core 32 by means of the elastic force of the movable contact piece, and the two fixed contacts 521 are simultaneously separated from the two movable contacts 42 of the movable contact piece 4, and the two fixed contact pieces 5 are electrically insulated from each other. In the state of the two fixed contact pieces 5 being electrically insulated from each other, signals are transmitted to the outside via the external plug through the two first conductive pins 91.

The Second Embodiment

As shown in FIG. 19 to FIG. 30, an electromagnetic relay includes a base 1, a casing 2, a coil 3, a movable contact piece 4 and two fixed contact pieces 5. The casing 2 is connected with the base 1. The coil 3 is wound on the bobbin 31 that is connected with the base 1. The bobbin 31 is between the base 1 and the casing 2. There is a core 32 installed in a center hole of the bobbin 31 that is connected to a yoke 33. The yoke 33 is L-shaped, and has one end connected to one side of the bobbin 31 and the other end in parallel to an axial direction of the coil 3. The movable contact piece 4 is bent in the middle portion thereof, and has one end connected to the other end of the yoke 33, and other end connected to the armature 41, and there are two movable contacts 42 on the second end of the movable contact piece 4.

The fixed contact piece 5 includes a plate-shaped base 51. A portion of one side of the plate-shaped base 51 extends outward and is bent to form a fixed contact fixing part 52 that is perpendicular to the plate-shaped base 51 and provided with fixed contacts 521. The two fixed contact pieces 5 are presented in a symmetrical structure and are respectively connected to the outer side surface of the base 1 and spaced from each other by using the plate-shaped base 51. The fixed contact fixing part 52 protrudes between the base 1 and the casing 2, and the fixed contact 521 faces to the movable contact 42 on the movable contact piece 4. A portion of the plate-shaped base 51 is outside the casing 2 and forms a connecting part connected to the load connection terminal. A connection through hole 511 is provided on the connecting part.

Figure 26:
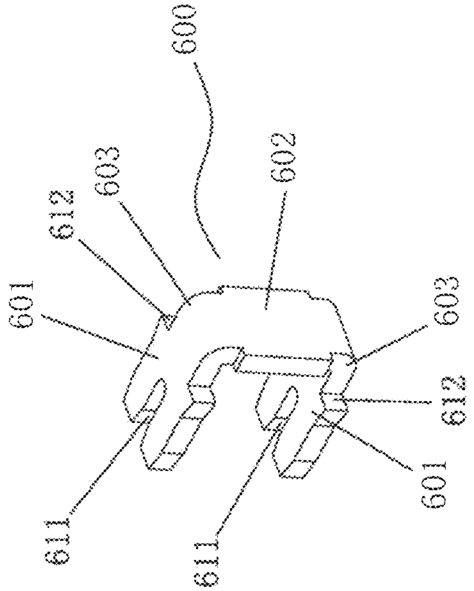
FIG. 26 is a perspective view of a conductive lead-out member of the second embodiment of the present disclosure.
Figure 27:
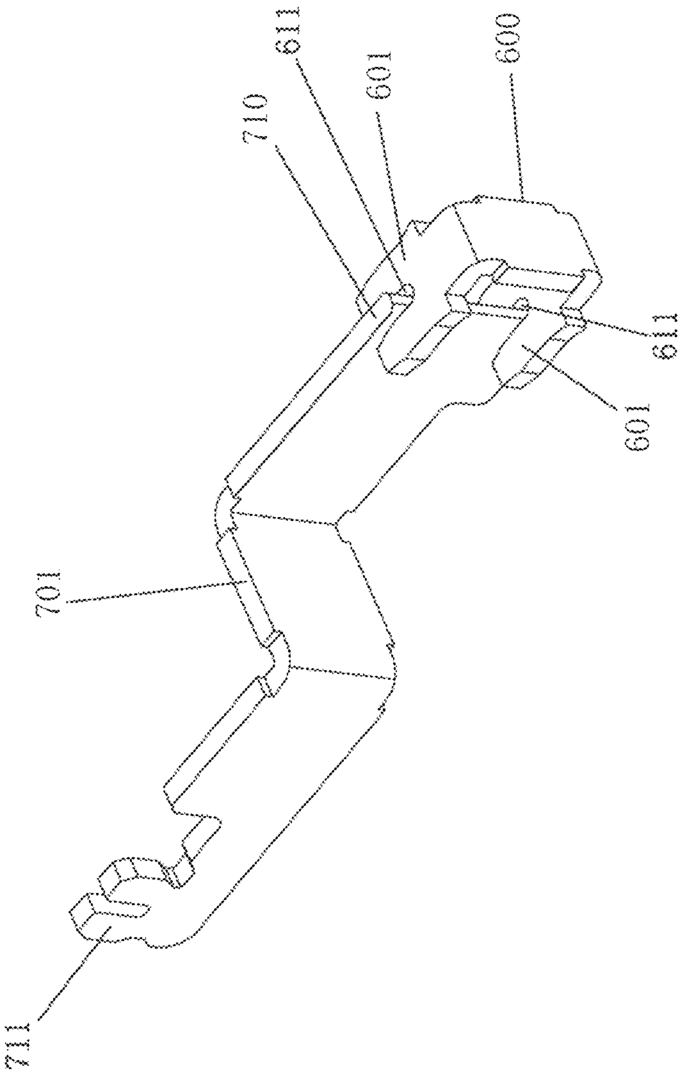
FIG. 27 is a perspective view showing that the conductive lead-out member is clipped with the first conductive pin of the second embodiment of the present disclosure.
Figure 28:
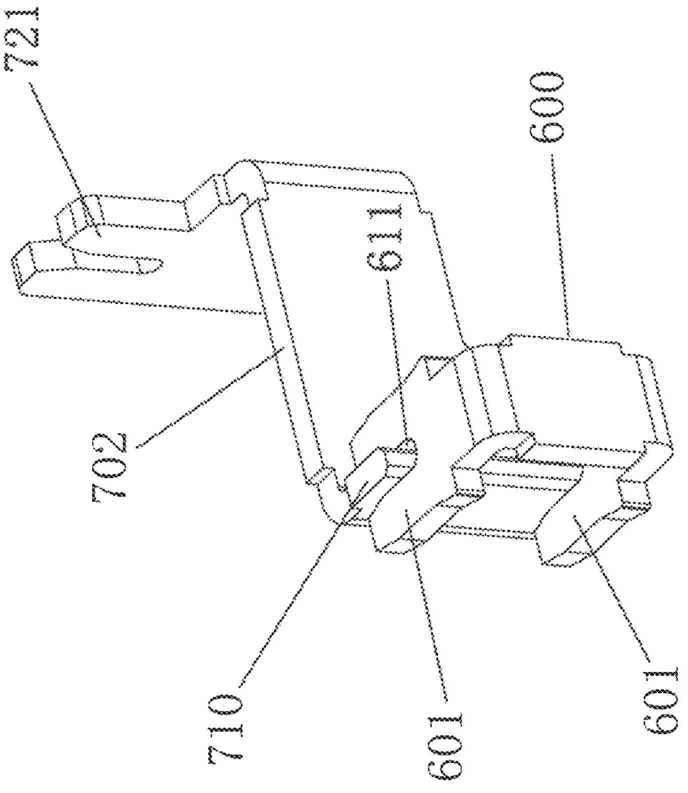
FIG. 28 is a perspective view showing that the conductive lead-out member is clipped with the second conductive pin of the second embodiment of the present disclosure.
Figure 29:
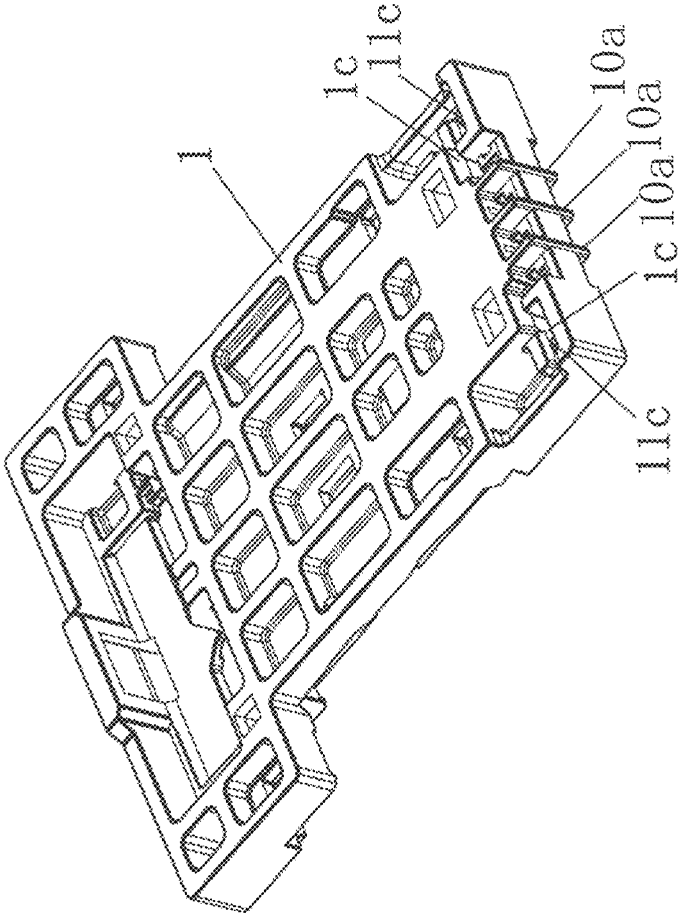
FIG. 29 is atop perspective view of abase of the second embodiment of the present disclosure.
Figure 30:
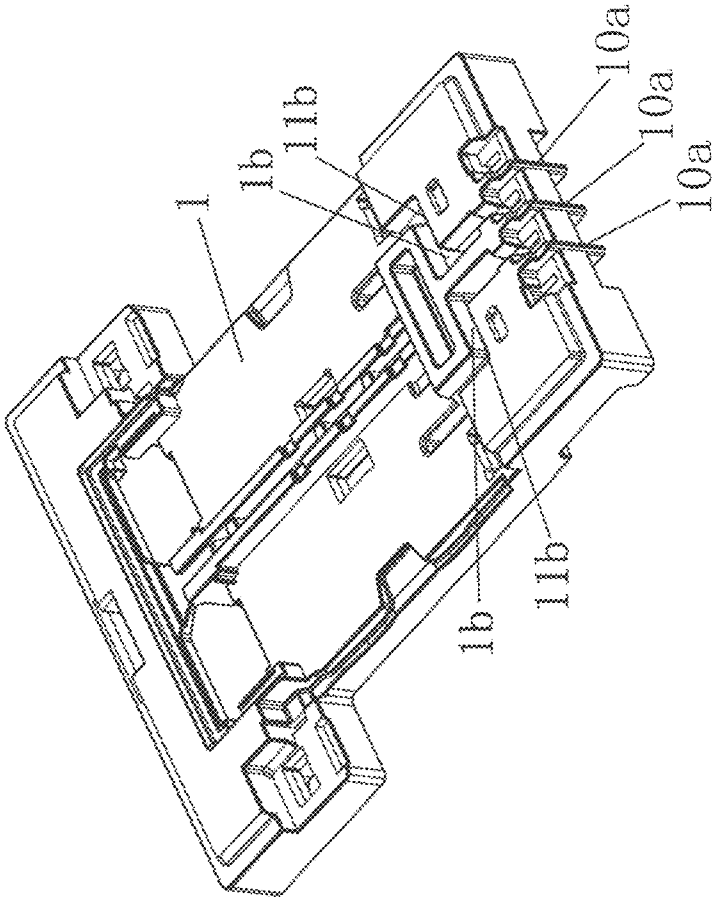
FIG. 30 is a bottom perspective view of the base of the second embodiment of the present disclosure.

Further referring to FIG. 26, four conductive lead-out members 600 are included in this embodiment. The conductive lead-out members 600 are electrically insulated from each other. The conductive lead-out member 600 is U-shaped, and is provided with two snapping parts 601 and one welding part 602, and the two clamping parts 601 both are perpendicular to the welding part 602. The two snapping parts 601 and the welding part 602 are connected by a bending part 603, the welding part 602 has a welding end surface that is the outer side surface of the welding part 602.

There are four conductive pins 700 embedded in the base 1. The conductive pins 700 are electrically insulated from each other. An electrical connecting part 710 is provided on one end of each conductive pin 700. The four electrical connecting parts 710 are parallel to each other and located at one end of the base 1. There are two abdicating through holes 210 at the casing 2 close to each of the electrical connecting parts 710. The two snapping parts 601 on each of the conductive lead-out member 600 respectively pass through the two abdicating through holes 210 and are snapped on the electrical connecting part 710 so as to realize electrical connection. The welding part 602 of each conductive lead-out member 600 is outside the casing 2, and the welding end surfaces of the welding parts 602 of all the conductive lead-out members 600 are on the same plane. When the electromagnetic relay is installed, the welding part 602 is welded with a PCB patch pad by the welding end surface, and the other end of the conductive pin 700 is electrically connected to the fixed contact piece 5 or the connection end of the coil 3.

There is a slot 611 provided on the snapping part 601 of the conductive lead-out member 600. The snapping part 601 is snapped on the electrical connecting part 710 by using the slot 611 and forms an interference fit, so as to ensure the reliability of the electrical connection.

Two shoulders 612 are provided on the snapping part 601 of the conductive lead-out member 600. The shoulders 612 cooperate with the inner side surface of the casing 2 to prevent the snapping part 601 of the conductive lead-out member 600 from being separated from the electrical connecting part 710 on the conductive pin 700.

A protruding part 10*a* is provided on the base 1 between two adjacent electrical connecting parts 710, and a matching groove 20*a* is provided on the inner side surface of the casing 2 facing to the protruding part 10*a*. The protruding part 10*a* cooperates with the matching groove 20*a* to increase a creepage distance and an electrical clearance between the adjacent conductive lead-out members 600 and ensure reliable electrical insulation between a high-voltage circuit and a low-voltage circuit so as to further improve the safety of use.

Two mounting parts 220 extending outward are provided on one side of the casing 2 away from the abdicating through hole 210. The mounting parts 220 are parallel to the welding plane. There is a mounting through hole 221 provided on the mounting part 220. A metal ring 222 is embedded in the inner wall of the mounting through hole 221. The metal ring 222 and the casing 2 are injection-molded as one piece. Two positioning columns 230 are provided on the outer side surface of the casing, on which the abdicating through hole 210 is provided. The two positioning columns 230 are parallel to an axial direction of the mounting through hole 221. The electromagnetic relay is positioned with the circuit board by using the two positioning columns 230. Two positioning through holes may be provided on the circuit board, and the two positioning columns 230 are matched with the two positioning through holes on the circuit board, so as to facilitate mutual positioning with the circuit board and ensure the accuracy of the welding position.

The inner side surfaces of the welding parts 602 of the conductive lead-out members 600 are attached to the same outer side surface of the casing 2, so that the welding end surfaces of the welding parts 602 of the conductive lead-out members 600 all are on the same plane.

There are two fixed contact pieces 5 and four conductive pins 700, wherein two conductive pins 700 are electrically connected to the two fixed contact pieces 5, respectively; and the other two conductive pins 700 are electrically connected to the two ends of the coils 3, respectively.

The conductive pin 700 electrically connected to the fixed contact piece 5 is a first conductive pin 701. Two first fitting slots 1*b* are provided on the outer side surface of the base 1, and the first conductive pin 701 is fitted to the first fitting slot 1*b*. A first conductive snapping part 711 is provided on the first conductive pin 701, and is perpendicular to the electrical connecting part 710. There is a snap through hole 55 on the plate-shaped base 51 of the fixed contact piece 5. The first conductive snapping part 711 is in contact with the snap through hole 55 to realize the electrical connection.

The conductive pin 700 electrically connected to one end of the coil 3 is a second conductive pin 702. There are two second fitting slots 1*c* provided on the inner side surface of the base 1, and the second conductive pin 702 is fitted to the second fitting slot 1*c*. A second conductive snapping part 721 is provided on the second conductive pin 702, and is perpendicular to the electrical connecting part 710. The second conductive snapping part 721 is snapped with the pin of the coil 3 to form an electrical connection.

Figure 23:
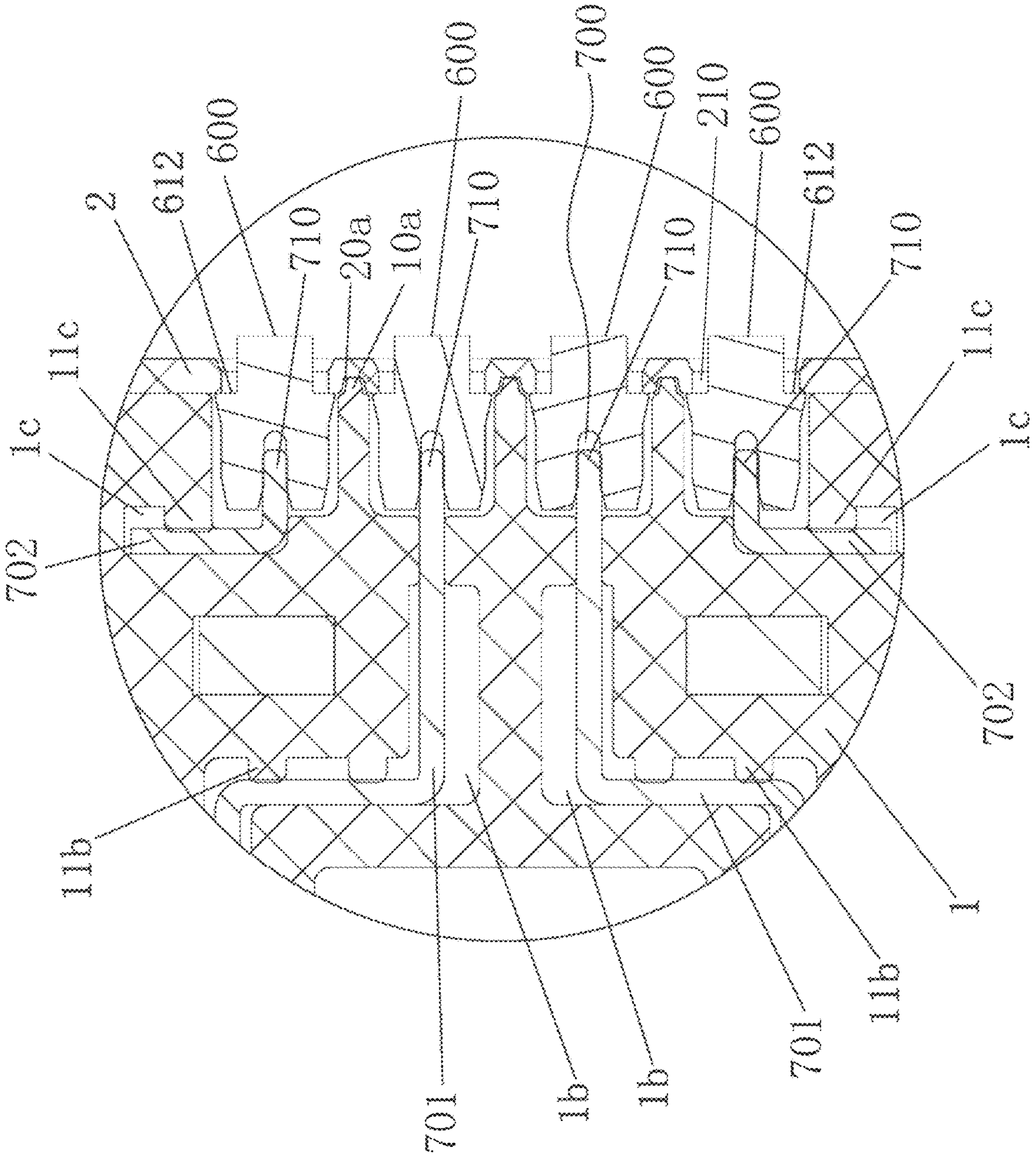
FIG. 23 is an enlarged view of G of FIG. 22.
Figure 24:
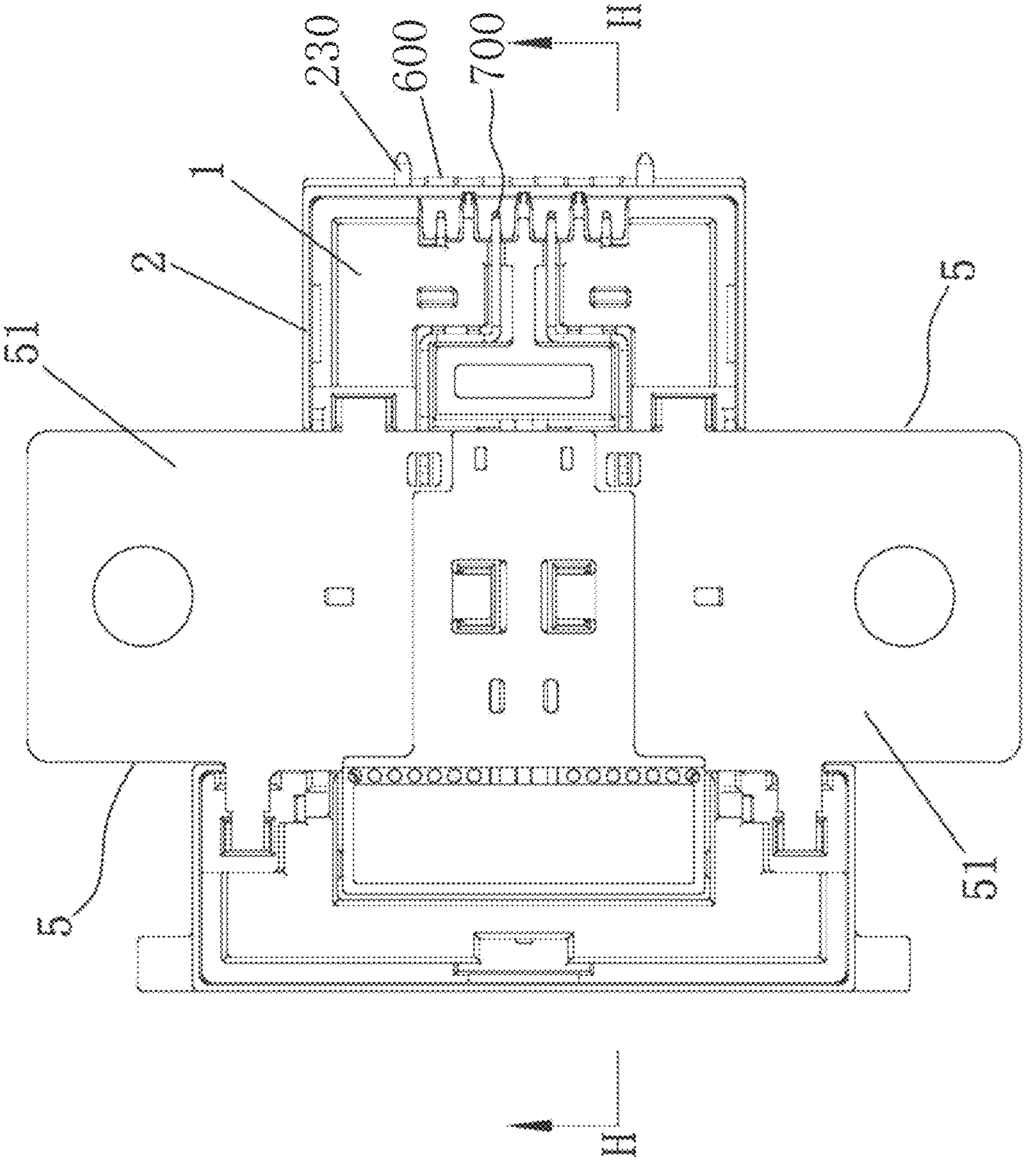
FIG. 24 is a bottom view of the second embodiment of the present disclosure.
Figure 25:
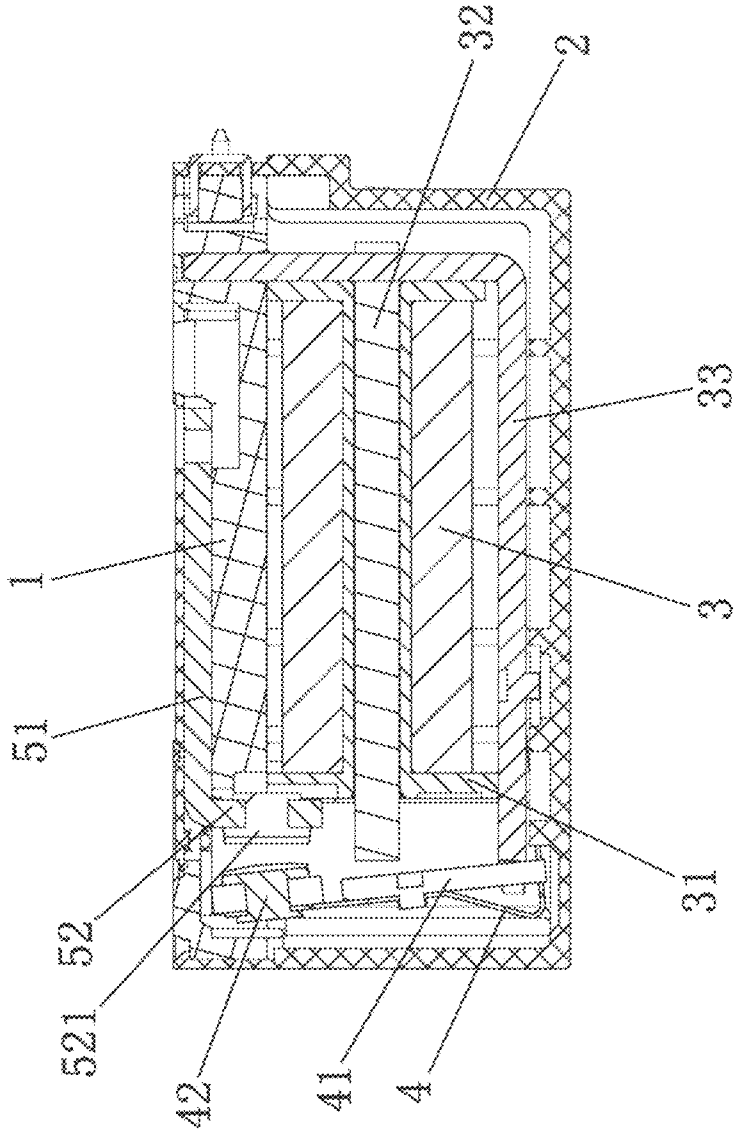
FIG. 25 is a H-H sectional view of FIG. 24.

Further, as shown in FIG. 23, the electrical connecting part 710 on the two first conductive pins 701 are in the middle position, and the electrical connecting parts 710 on the two second conductive pins 702 are on the two sides.

A plurality of first matching protrusions 11*b* are provided on the inner side surface of the first fitting slot 1*b*, and the first matching protrusions 11*b* stand against the first conductive pins 701 to prevent the first conductive pins 701 from being loosen; a plurality of second matching protrusions 11*c* are provided on the inner side surface of the second fitting slot 1*c*, and the second matching protrusions 11*c* stand against the second conductive pin 702 to prevent the second conductive pin 702 from being loosen.

In this embodiment, the relay is entirely fixed by using the two mounting parts 220 of the casing 2, and then positioned with the circuit board by using the two positioning columns 230. The welding end surfaces on the four welding parts 602 are attached to the facing to PCB patch pad, to be welded, so that the control power supply can be input to the coil 3 through the circuit board, and then the working status of the two fixed contact pieces 5 can be collected through the circuit board.

According to the present disclosure, the fixed contact piece includes a plate-shaped base, and a portion of one side of the plate-shaped base extends outward and is bent to form a fixed contact fixing part. Fixed contacts are provided on the fixed contact fixing part. An abdicating through hole is provided in the base. The plate-shaped bases of the two fixed contact pieces are respectively connected to the outer side surface of the base and spaced from each other, and the fixed contact fixing part extends into the space between the base and the casing through the abdicating through hole. In this way. The main body of the fixed contact piece is outside, and it is easy to transfer heat to the outside in the form of thermal radiation and thermal convection, so as to greatly improve the heat dissipation effect of the fixed contact piece, and can improve the performance of the relay with relatively high power. In addition, there is no need to injection-mold the fixed contact piece with the base; On the one hand, it is possible to protect the fixed contact piece and the fixed contact better, greatly simplify the injection molding process of the base, effectively reduce the manufacturing cost and prolong the service life of the relay.

On the other hand, since the main body of the fixed contact piece is outside the base, it is possible to increase the electrical clearance and the creepage distance between the fixed contact piece and the coil and prevent the mutual influence of the high and low voltages. The present disclosure also facilitates automated assembly.

The above are only two preferred embodiments of the present disclosure, and equivalent modifications made by a person skilled in the art depending on the claims all fall within the protection scope of this case.

It should be understood that the application of the present disclosure is not limit to the detailed structure and arrangement of components provided in this specification. The present disclosure can have other embodiments, and can be implemented and carried out in various ways. The aforementioned variations and modifications fall within the scope of the present disclosure. It should be understood that the disclosure disclosed and defined in this specification may extend to all alternative combinations of two or more individual features that are apparent or mentioned in the text and/or drawings. All of the different combinations form various alternative aspects of the present disclosure. Embodiments described in this specification illustrate the best modes known for carrying out the present disclosure, and will allow those skilled in the art to utilize the present disclosure.

What is claimed is:

1. An electromagnetic relay, comprising:

a base;

a casing fixedly connected to the base;

a coil, a movable contact piece and a fixed contact piece, both the coil and the movable contact piece being located between the casing and the base, the fixed contacts on the fixed contact piece corresponding to the movable contacts on the movable contact piece;

a plurality of conductive lead-out members, each conductive lead-out member being electrically connected to the fixed contact piece or the coil, the plurality of conductive lead-out members being electrically insulated from each other, each conductive lead-out member being provided with a welding part, at least a portion of the welding part of each conductive lead-out member passing through an abdicating through hole on the casing, the welding part being provided with a welding end surface, the welding end surface is planar, all of the welding end surfaces of the welding parts of the conductive lead-out members being positioned at the same plane; when the electromagnetic relay is installed, the welding part being welded with a pad for surface mounted technology by the welding end surface;

a plurality of conductive pins electrically insulated from each other, one end of each conductive pin is connected to the electrical connecting part of the conductive lead-out member, and the other end is connected to the fixed contact piece or the coil;

wherein each conductive lead-out member is provided with a snapping part, the snapping part and the welding part are connected by a bending part, the plurality of conductive pins are embedded in the base, the plurality of electrical connecting parts are parallel with each other and located at one end of the base, the abdicating through hole is positioned on the casing close to the electrical connecting part, the snapping part of each conductive lead-out member passes through the abdicating through hole and is snapped on the electrical connecting part so as to realize electrical connection.

2. The electromagnetic relay according to claim 1, wherein each conductive lead-out member is L-shaped, the snapping part and the welding part are perpendicular to each other in each conductive lead-out member.

3. The electromagnetic relay according to claim 1, wherein each conductive lead-out member is U-shaped, each conductive lead-out member is provided with two snapping parts and one welding part, both snapping parts are perpendicular to the welding part; the casing close to the electrical connecting part are provided with two abdicating through holes, two snapping parts of each conductive lead-out member are respectively pass through two abdicating through holes and snapped on one electrical connecting part at the same time.

4. The electromagnetic relay according to claim 1, wherein the snapping part of each conductive lead-out member is provided with a shoulder, the shoulder cooperates with an inner side surface of the casing to prevent the snapping part of the conductive lead-out member from being separated from the electrical connecting part on the conductive pin.

5. The electromagnetic relay according to claim 1, wherein the snapping part of each conductive lead-out member is provided with a slot, the snapping part is snapped on the electrical connecting part by using the slot and forms an interference fit.

6. The electromagnetic relay according to claim 1, wherein a protruding part is provided on the base between two adjacent electrical connecting parts, and a matching groove is provided on an inner side surface of the casing facing to the protruding part, the protruding part cooperates with the matching groove to increase a creepage distance and an electrical clearance between the adjacent conductive lead-out members.

7. The electromagnetic relay according to claim 1, wherein all of the welding parts of the conductive lead-out members are attached to a same outer side surface of the casing, so that the welding end surfaces of the welding parts of the conductive lead-out members are all on the same plane.

8. The electromagnetic relay according to claim 1 3, wherein a mounting part extending outward is provided on one side of the casing away from the abdicating through hole, the mounting part is parallel to the welding plane, a mounting through hole is provided on the mounting part, a metal ring is embedded in an inner wall of the mounting through hole, the metal ring and the casing are injection-molded as one piece, two positioning columns are provided on an outer side surface of the casing, on which the abdicating through holes are provided, the two positioning columns are parallel to an axial direction of the mounting through hole, the electromagnetic relay is positioned with the circuit board by using the two positioning columns.

9. The electromagnetic relay according to claim 1, wherein there are two fixed contact pieces and four conductive pins, wherein two conductive pins are electrically connected to two fixed contact pieces, respectively; and the other two conductive pins are electrically connected to the two ends of the coils, respectively, the conductive pin electrically connected to the fixed contact piece is a first conductive pin, two first fitting slots are provided on an outer side surface of the base, and the first conductive pin is fitted to the first fitting slot, a first conductive snapping part is provided on the first conductive pin, and is perpendicular to the electrical connecting part, a snap through hole is provided on the plate-shaped base of the fixed contact piece, the first conductive snapping part is in contact with the snap through hole, the conductive pin electrically connected to one end of the coil is a second conductive pin, there are two second fitting slots provided on an inner side surface of the base, and the second conductive pin is fitted to the second fitting slot, a second conductive snapping part is provided on the second conductive pin, and is perpendicular to the electrical connecting part, the second conductive snapping part is snapped with the pin of the coil to form an electrical connection.

10. The electromagnetic relay according to claim 9, wherein first matching protrusions are provided on an inner side surface of the first fitting slot, and the first matching protrusions stand against the first conductive pins to prevent the first conductive pins from being loosen; second matching protrusions are provided on an inner side surface of the second fitting slot, and the second matching protrusions stand against the second conductive pin to prevent the second conductive pin from being loosen.

11. The electromagnetic relay according to claim 1, further comprising:

a bobbin fixedly connected to the base; the coil is installed on the bobbin.

12. The electromagnetic relay according to claim 1, wherein the fixed contact piece is fixedly connected to the base.

* * * * *